United States Patent
Yagi et al.

(10) Patent No.: US 7,826,012 B2
(45) Date of Patent: Nov. 2, 2010

(54) COLOR FILTER SUBSTRATE, LIQUID CRYSTAL DISPLAY APPARATUS INCLUDING COLOR FILTER SUBSTRATE, AND METHOD OF MANUFACTURING COLOR FILTER SUBSTRATE

(75) Inventors: Toshifumi Yagi, Tsu (JP); Toshihide Tsubata, Tsu (JP); Tsuyoshi Tokuda, Tsu (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 12/491,015

(22) Filed: Jun. 24, 2009

(65) Prior Publication Data

US 2009/0257008 A1    Oct. 15, 2009

Related U.S. Application Data

(62) Division of application No. 11/017,831, filed on Dec. 22, 2004, now Pat. No. 7,570,323.

(30) Foreign Application Priority Data

Dec. 26, 2003  (JP)  ............................. 2003-432632
Nov. 29, 2004  (JP)  ............................. 2004-344645

(51) Int. Cl.
   *G02F 1/1335*    (2006.01)
   *G02F 1/1339*    (2006.01)

(52) U.S. Cl. ..................... 349/106; 349/110; 349/155

(58) Field of Classification Search ................. 349/106, 349/110, 155
See application file for complete search history.

(56) References Cited

U.S. PATENT DOCUMENTS

| 5,680,187 A | 10/1997 | Nagayama et al. |
| 6,292,249 B1 | 9/2001 | Kane et al. |
| 6,671,025 B1 | 12/2003 | Ikeda et al. |
| 7,570,323 B2 * | 8/2009 | Yagi et al. ................... 349/106 |
| 2001/0026347 A1 | 10/2001 | Sawasaki et al. |

FOREIGN PATENT DOCUMENTS

| JP | 8-201790 A | 8/1996 |
| JP | 11-183915 | 7/1999 |
| JP | 2002-055349 A | 2/2002 |
| JP | 2003-014917 A | 1/2003 |

* cited by examiner

*Primary Examiner*—Michael H Caley
(74) *Attorney, Agent, or Firm*—Birch, Stewart, Kolasch & Birch, LLP

(57) ABSTRACT

A color filter substrate and a liquid crystal display apparatus include, on a substrate: a colorized layer including color layers; a stacked layer protruding in comparison with the colorized layer; an opposing electrode covering the colorized layer and the stacked layer; an alignment layer formed at least on a part of the opposing electrode covering the colorized layer; and an insulating layer stacked on an entire surface of another part of the opposing electrode covering the stacked layer. With this, the short circuit between the opposing electrode and a pixel electrode is prevented, so that a color filter substrate, a liquid crystal display apparatus including the color filter substrate, and a method of manufacturing the color filter substrate, those being able to improve the yield of the liquid crystal display apparatus, are provided.

9 Claims, 14 Drawing Sheets

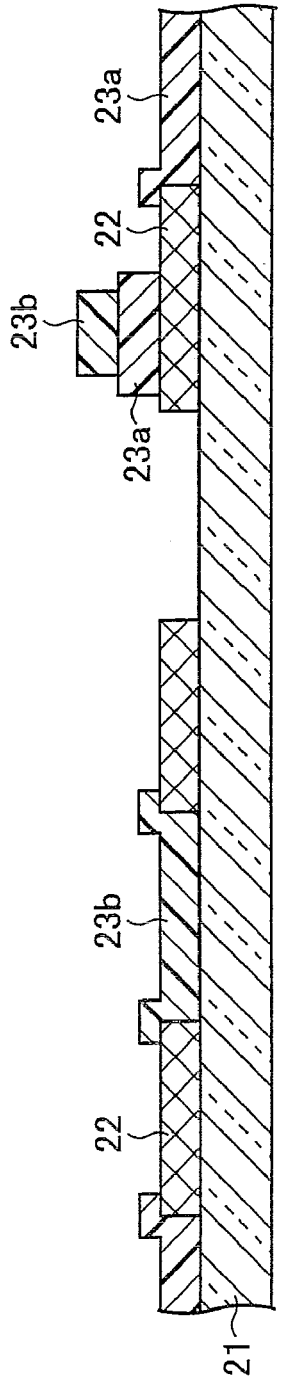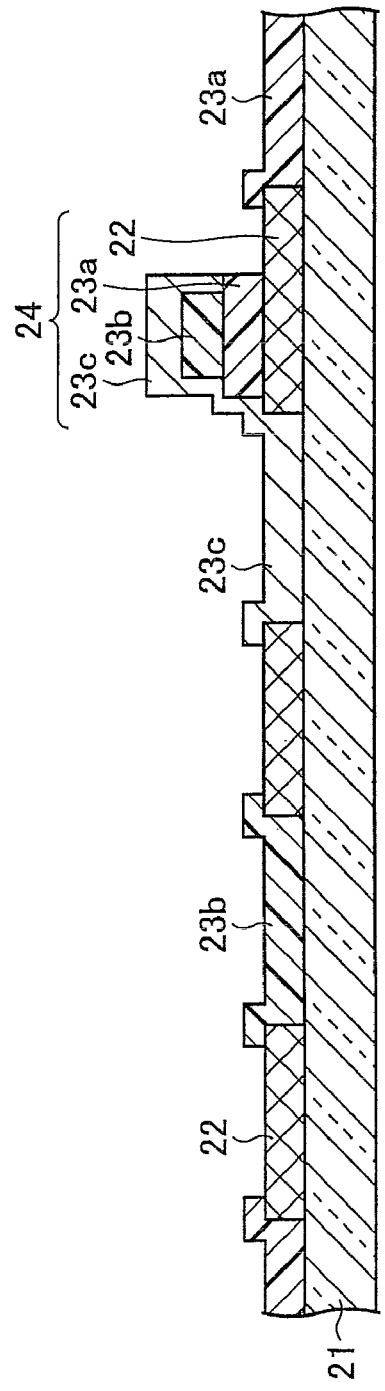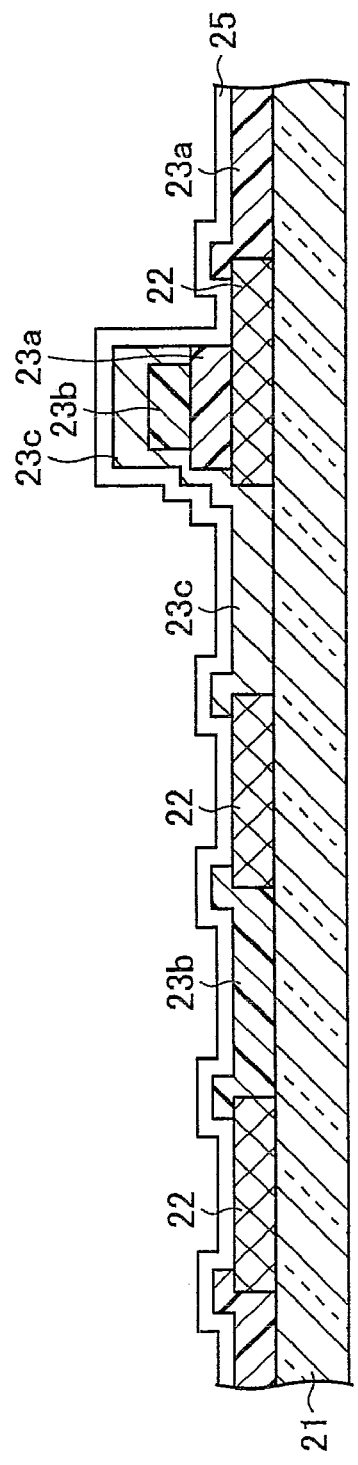

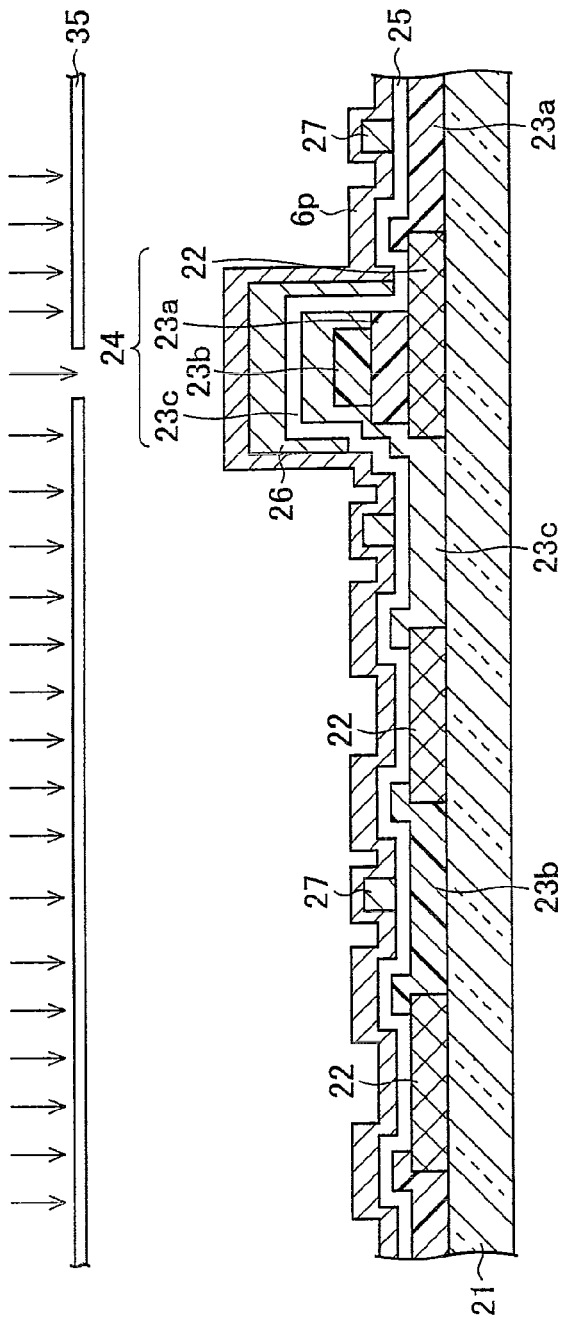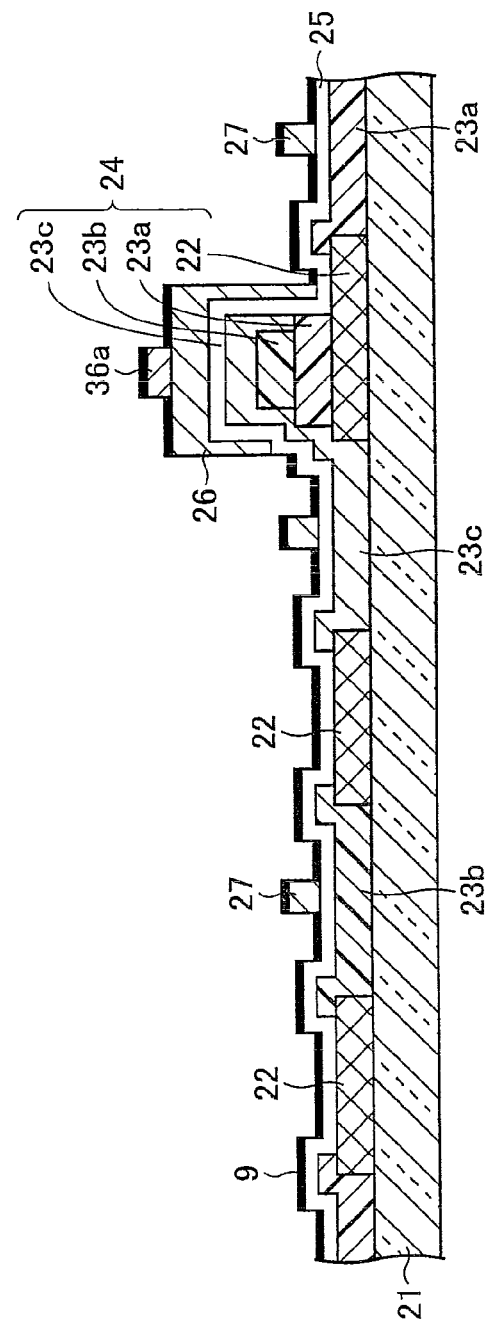
FIG. 8 (a)
FIG. 8 (b)

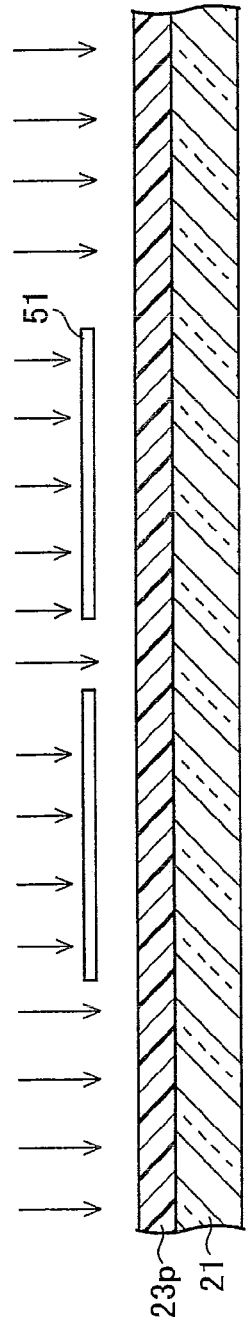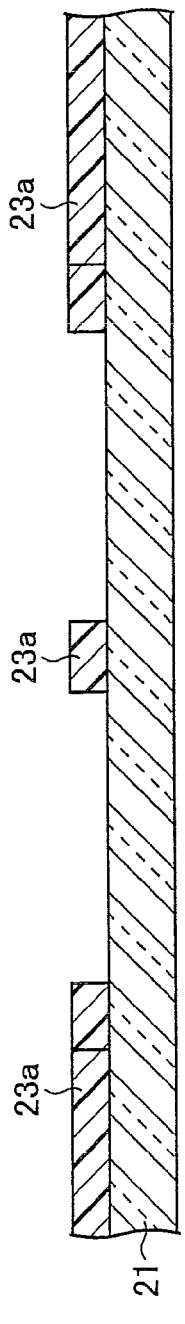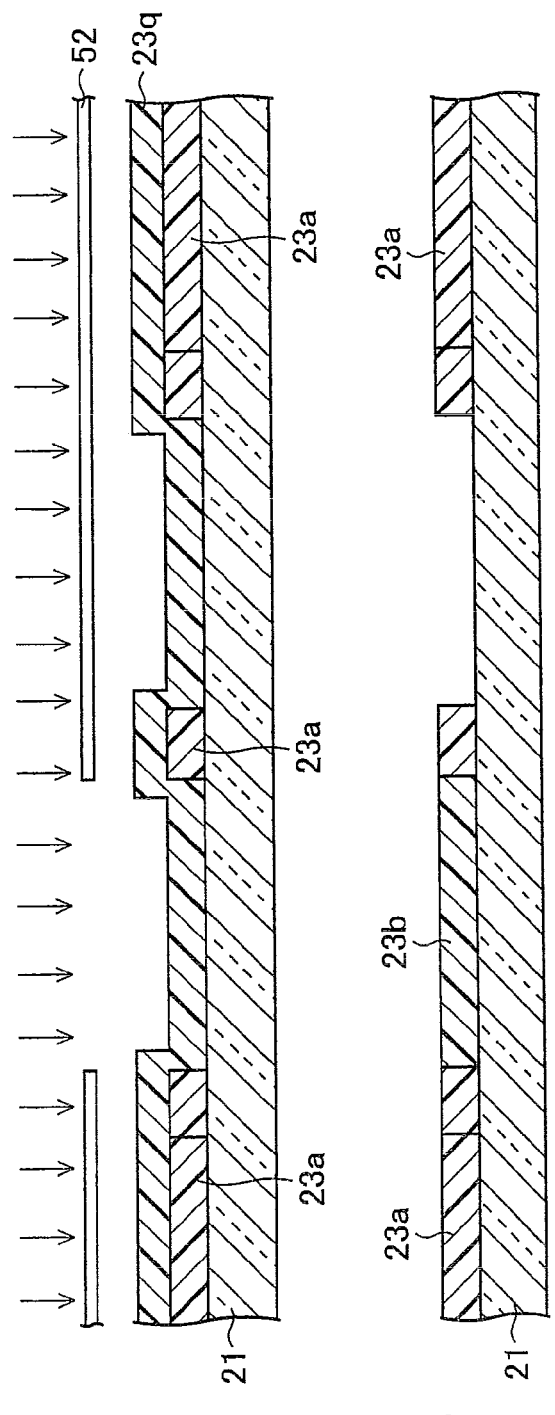
FIG. 11 (a) FIG. 11 (b) FIG. 11 (c) FIG. 11 (d)

COLOR FILTER SUBSTRATE, LIQUID CRYSTAL DISPLAY APPARATUS INCLUDING COLOR FILTER SUBSTRATE, AND METHOD OF MANUFACTURING COLOR FILTER SUBSTRATE

This application is a Divisional application of U.S. application Ser. No. 11/017,831, filed Dec. 22, 2004 now U.S. Pat. Ser. No. 7,570,323. Application Ser. No. 11/017,831 claims priority under 35 U.S.C.§119(a) to patent application No. 2003-0432632 filed in Japan on Dec. 26, 2003 and application No. 2004-344645 filed in Japan on Nov. 29, 2004, all of which are hereby expressly incorporated by reference into the present application.

FIELD OF THE INVENTION

The present invention relates to a color filter substrate, a liquid crystal display apparatus including the same, and a method of manufacturing the color filter substrate.

BACKGROUND OF THE INVENTION

A liquid crystal display apparatus is typically arranged in such a manner that liquid crystal is enclosed between a pair of substrate opposing to each other. That is, in a liquid crystal display apparatus shown in FIG. 13, liquid crystal 75 is enclosed between a TFT (Thin Film Transistor) array substrate 70 and a color filter substrate 80. The TFT array substrate 70 is arranged such that a TFT circuit layer 72 including TFT elements and the like, an insulative layer 73, and pixel electrodes 74 are provided on a transparent substrate 71, and an alignment layer (not illustrated) is further provided. The color filter layer 83 (83a, 83b, and 83c) having three colors, a protruding structure section 84 where a plurality of color filter layers 83 are stacked, and an opposing electrode 85 are formed on a substrate 81, and an alignment layer (not illustrated) is further provided. In the liquid crystal display apparatus, a predetermined cell gap is maintained between the TFT array substrate 70 and the color filter substrate 80, by a spacer (not illustrated) made of plastic bead, glass fiber, and the like.

As FIG. 14 shows, Japanese Laid-Open Patent Application No. 2003-14917 (Tokukai 2003-14917; published on Jan. 15, 2003) and Japanese Laid-Open Patent Application No. 2001-201750 (Tokukai 2001-201750; published on Jul. 7, 2001) have disclosed a liquid crystal display apparatus in which, instead of the spacer made of plastic bead, glass fiber, and the like, resin layers 86 formed by photolithography and the like are formed as spacers between the pixel electrodes 74 and the opposing electrode 85.

In the liquid crystal display apparatus shown in FIG. 13 and the liquid crystal display apparatus (shown in FIG. 14) disclosed by the above-mentioned patent publications, however, said at least one protruding structure section 84 made up of the color filter layers 83 being stacked is provided, so that the opposing electrode 85 on the top of said at least one protruding structure section 84 is in close vicinity of the pixel electrodes 74. That is to say, a cell gap between the pixel electrodes 74 and the opposing electrode 85 on the color filter layer 83 is 3 μm-6 μm wide, except at the color filter layers 83 constituting said at least one protruding structure section 84. Each color filter layer 83 is 0.8 μm-2 μm thick. On this account, at said at least one protruding structure section 84 where the color filter layers 83 are stacked, the distance between the opposing electrode 85 and the pixel electrodes 74 is 0.1 μm-2 μm.

Because of this arrangement, at a space between the opposing electrode 85 on said at least one protruding structure section 84 and the pixel electrodes 74, short circuit tends to occur due to a minute conductive matter 76 adhered to the opposing electrode 85, said at least one protruding structure section 84, the pixel electrodes 74, and the like, as shown in FIGS. 13 and 14. As described above, the conductive alignment layers are formed on the opposing electrode 85 and the pixel electrodes 74. These alignment layers are very thin (each 0.05 μm-0.08 μm thick), so that these alignment layers are easily ripped by the conductive matter 76.

To solve this problem, Japanese Laid-Open Patent Application No. 2002-55349 (Tokukai 2002-55349; published on Feb. 20, 2002) discloses a liquid crystal display apparatus that prevents the short circuit between the opposing electrode 85 and the pixel electrodes 74 by removing either (i) an area of the opposing electrode 85 formed on said at least one protruding structure section 84 on the color filter substrate 80 shown in FIG. 14, the area facing the pixel electrodes 74 (hereinafter, this area will be referred to as a facing area of the opposing electrode 85) or (ii) an area of the pixel electrodes 74, the area facing the opposing electrode 85 formed on said at least one protruding structure section 84 (hereinafter, this area will be referred to as a facing area of the pixel electrodes 74).

Furthermore, in order to prevent the short circuit between the opposing electrode 85 and the pixel electrodes 74, the above-identified document also discloses a liquid crystal display apparatus in which an electric insulation film is sandwiched between the opposing electrode formed on the protruding structure 84 and the pixel electrodes 74 opposing to the opposing electrode.

However, among the liquid crystal display apparatuses disclosed by Japanese Laid-Open Patent Application No. 2002-55349, the liquid crystal display apparatus in which either the opposing area of the opposing electrode 85 or the opposing area of the pixel electrodes 74 is removed requires that the opposing electrode 85 and the pixel electrodes 74 are sufficiently detached from each other, in order to prevent the short circuit between the opposing electrode 85 and the pixel electrodes 74 on account of the misalignment between the TFT array substrate and the color filter substrate, when these members are laminated. Moreover, in the aforesaid opposing areas, no voltage is applied to liquid crystal so that the liquid crystal is not aligned. On this account, the alignment of the liquid crystal is spoiled and the leakage of light occurs, so that the image quality and display contrast deteriorate.

Also, in the liquid crystal display apparatus in which the electric insulation film is interposed between the opposing electrode 85 formed on said at least one protruding structure section 84 and the pixel electrodes 74, the insulation at the area where the opposing electrode 85 faces the pixel electrodes 74 is maintained. However, as shown in FIG. 14, short circuit by way of a conductive matter 76 may occur between (i) a part of the opposing electrode 85 along the direction of stacking the color filter layers 83 of said at least one protruding structure section 84 and (ii) the pixel electrodes 74. That is to say, the opposing electrode 85 on said at least one protruding structure section 84 in which the color filter layers 83 are stacked is closer to the pixel electrodes 74 than the opposing electrode 85 on the color filter layer 83 rather than on said at least one protruding structure section 84. On this account, the opposing electrode 85 covering said at least one protruding structure section 84 is liable to short-circuit with the pixel electrodes 74 on account of the conductive matter 76.

SUMMARY OF THE INVENTION

The objective of the present invention is to provide (i) a color filter substrate that can improve the yield of a liquid crystal display apparatus by preventing an opposing electrode from short-circuiting with a pixel electrode and can provide a liquid crystal display apparatus that excels in display quality and display contrast, (ii) a liquid crystal display apparatus including the color filter substrate, and (iii) a method of manufacturing the color filter substrate.

To achieve the aforesaid objective, a color filter substrate of the present invention comprises a substrate, on the substrate, at least one protruding structure section in which a plurality of color layers are stacked, an opposing electrode, and an alignment layer being formed, and an insulating layer being stacked on an entire surface of a part of the opposing electrode, the part covering said at least one protruding structure section.

To achieve the aforesaid objective, a color filter substrate of the present invention comprises: a colorized layer that is formed on a substrate and includes a plurality of color layers being aligned side by side; at least one protruding structure section that is formed on the substrate, includes a plurality of color layers being stacked, and protrudes in comparison with the colorized layer; an opposing electrode covering the colorized layer and said at least one protruding structure section; and an alignment layer stacked on at least a part of the opposing electrode, the part covering the colorized layer, an insulating layer being stacked on an entire surface of another part of the opposing electrode, said another part covering said at least one protruding structure section.

According to the arrangements above, on the substrate, said at least one protruding structure section in which the color layers are stacked protrudes in comparison with the colorized layer. On this account, when the color filter substrate is adopted as one of a pair of opposing substrates adopted in a liquid crystal display apparatus and the like, a part of the opposing electrode on said at least one protruding structure section is close to the pixel electrode substrate that is another one of the pair of the opposing substrate and faces the color filter substrate, in comparison with another part of the opposing electrode on the colorized layer. On this account, when a foreign matter existing between the pair of the opposing substrates enters the space where the part of the opposing electrode is close to the pixel electrode, the part of the opposing electrode on said at least one protruding structure section tends to touch the pixel electrode on the pixel electrode substrate, on account of the (conductive) foreign matter.

For this reason, in the above-described arrangement, the insulating layer is stacked on the entire surface of the part of the opposing electrode covering said at least one protruding structure section. With this, it is possible to prevent the opposing electrode on said at least one protruding structure section from being in touch with the foreign matter.

The short circuit between the opposing electrode and the pixel electrode is prevented as above, so that the color filter substrate that can improve the yield of the liquid crystal display apparatus and can provide the liquid crystal display apparatus that excels in the display quality and the display contrast can be provided.

To solve the aforesaid problem, the liquid crystal display apparatus of the present invention is provided with the aforesaid color filter substrate.

According to this arrangement, even if a conductive matter and the like exists in liquid crystal being in touch with the color filter substrate, it is possible to prevent the conductive matter from being in touch with the part of the opposing electrode on said at least one protruding structure section protruding from the substrate of the color filter substrate.

To solve the aforesaid problem, the method of manufacturing the color filter substrate of the present invention comprises the steps of: (I) forming, on a substrate, at least one protruding structure section in which a plurality of color layers are stacked; (II) forming an opposing electrode at least on said at least one protruding structure section; and (III) stacking an insulating layer, which is different from an alignment layer, on an entire surface of the opposing electrode on said at least one protruding structure section.

To solve the aforesaid problem, the method of manufacturing the color filter substrate of the present invention comprises: (I) forming, on a substrate, (i) a colorized layer including a plurality of color layers being aligned side by side, and (ii) at least one protruding structure section that includes a plurality of color layers being stacked and protrudes in comparison with the colorized layer; (II) forming an opposing electrode covering the colorized layer and said at least one protruding structure layer; (III) forming an alignment layer on a part of the opposing electrode, the part covering the colorized layer; and (IV) stacking an insulating layer on an entire surface of another part of the opposing electrode, said another part covering said at least one protruding structure section.

According the methods, the insulating layer is formed on the entire surface of the opposing electrode, so that it is possible to provide the method of manufacturing the color filter substrate that can prevent a foreign matter from being in touch with the part of the opposing electrode on said at least one protruding structure section protruding from the substrate of the color filter substrate.

For a fuller understanding of the nature and advantages of the invention, reference should be made to the ensuing detailed description taken in conjunction with the accompanying drawings.

BRIEF DESCRIPTION OF THE DRAWINGS

FIGS. 5(*a*)-5(*c*) are cross sections further showing the manufacturing process of the color filter substrate.

FIGS. 8(*a*) and 8(*b*) are cross sections showing a manufacturing process of the color filter substrate.

FIGS. 11(a)-11(d) are cross sections showing a manufacturing process of the color filter substrate.

DESCRIPTION OF THE EMBODIMENTS

Embodiment 1

Figure 1:
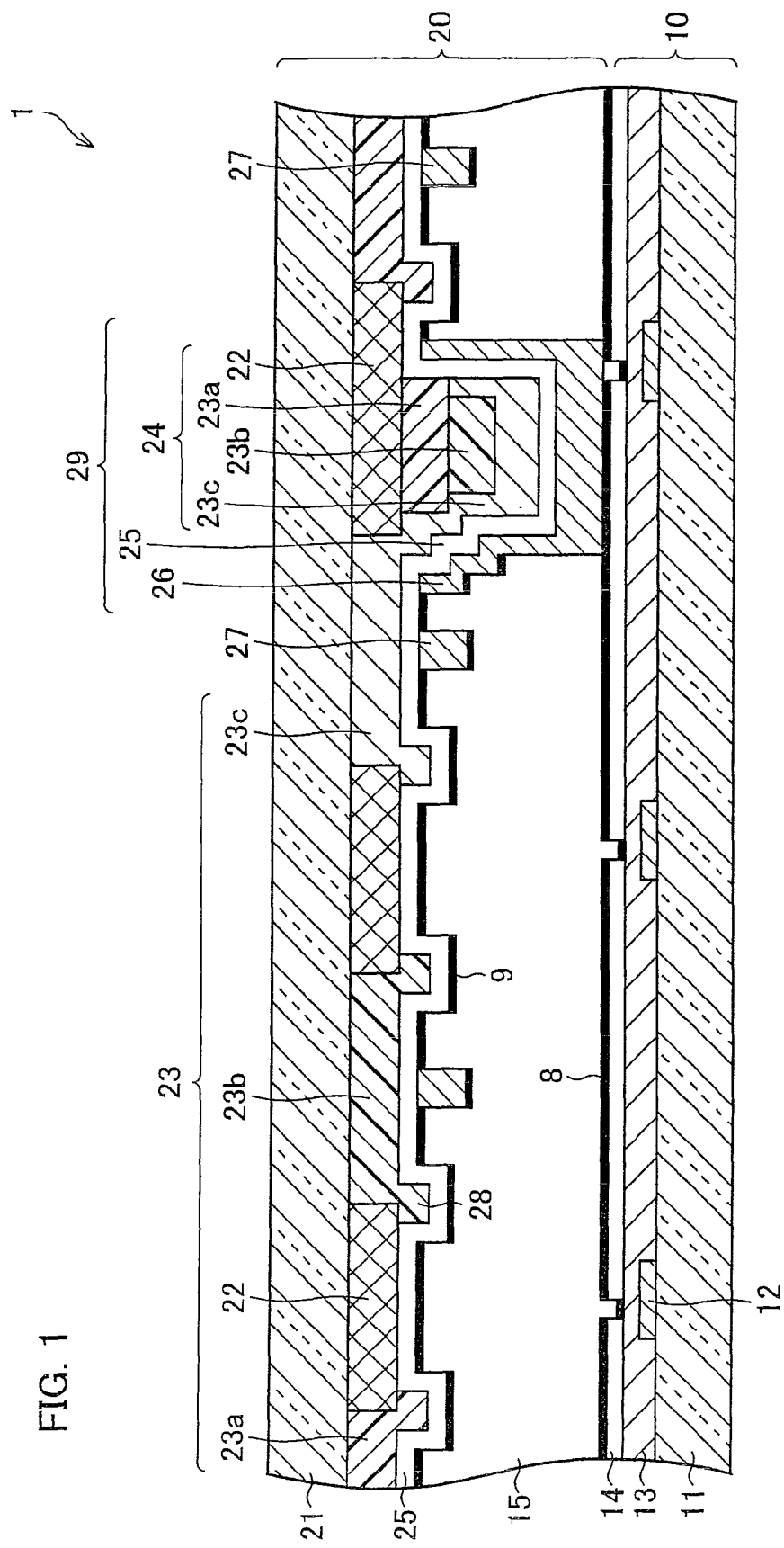
FIG. 1 is a cross section of an embodiment of a liquid crystal display apparatus including a color filter substrate of the present invention.
Figure 2:
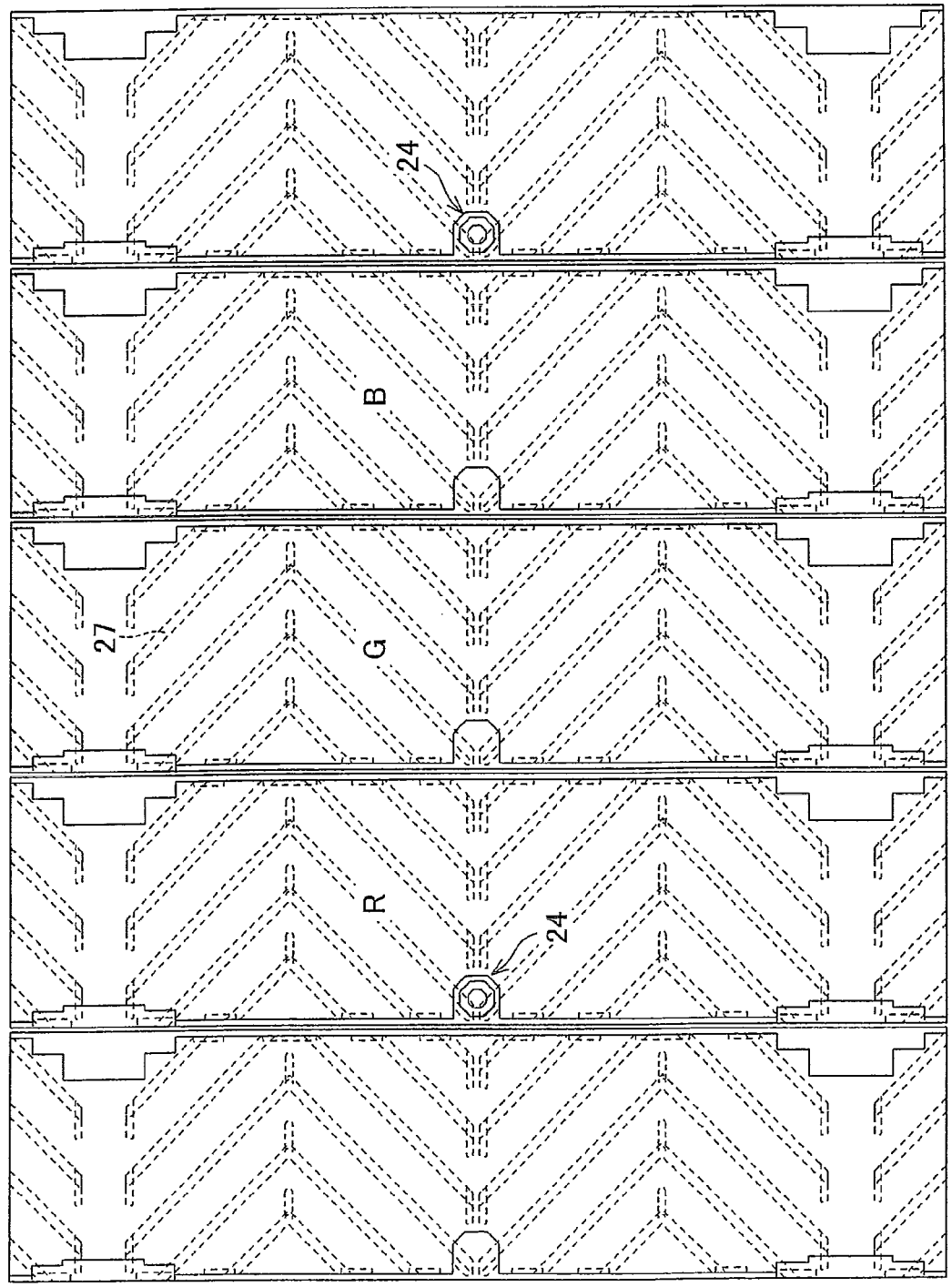
FIG. 2 is a plan view showing an example of the color filter substrate, so as not necessarily to correspond to FIG. 1.

The following will describe an embodiment of the present invention in reference to FIGS. 1-6. FIG. 1 is a cross section of a liquid crystal display apparatus 1 of the present embodiment. FIG. 2 is a plan view of a color filter substrate of the present embodiment. Note that the liquid crystal display apparatus 1 of the present embodiment has a MVA (Multi-domain Vertical Alignment) structure. The structure of the liquid crystal display apparatus 1, however, is not limited to this MVA. Note that, the MVA structure is such an arrangement that liquid crystal molecules between a pair of substrate are vertically aligned when no voltage is applied, and one pixel is partitioned into more than one domain. That is, in the MVA structure, one pixel is partitioned into more than one domain in order to improve the viewing angle characteristics of a vertically-aligned liquid crystal display apparatus, and there are such methods of forming the domains as: cutting off, in a slit-shape, a pixel electrode of a TFT array substrate or an opposing electrode of a color filter substrate, so as to form an electrode opening section; and forming, in a rib-shape, a liquid crystal alignment controlling protrusion (corresponding to a protruding section 27 shown in FIG. 1 and a V-shaped pattern in FIG. 2) on a substrate. According to the MVA structure, the viewing angle is widened by dispersing the direction of the alignment of liquid crystal molecules in the pixel, by utilizing a fringe field effect on account of the electrode opening section and the liquid crystal alignment controlling protrusion, or by utilizing the tilted alignment of the liquid crystal molecules in the protruding tilted section.

This liquid crystal display apparatus 1 is arranged in such a manner that, as FIG. 1 illustrates, liquid crystal (liquid crystal layer) 15 such as vertically-aligned liquid crystal is enclosed between a TFT (Thin Film Transistor) array substrate (opposing substrate, pixel electrode substrate) 10 and a color filter substrate 20. Although not being illustrated, the liquid crystal display apparatus 1 is further provided with polarizing plates formed on the respective surfaces of the TFT array substrate 10 and the color filter substrate 20, the surfaces both not facing the liquid crystal 15. In these polarizing plates, the polarizing axis of the polarizing plate opposing to the TFT array substrate 10 is orthogonal to the polarizing axis of the polarizing plate opposing to the color filter substrate 20.

As shown in FIG. 1, the TFT array substrate 10 is arranged in such a manner that a TFT circuit layer 12 is provided on a transparent substrate 11, a TFT-side insulative layer 13 is formed so as to cover the surface of the transparent substrate 11 and the TFT circuit layer 12, and on the TFT-side insulative layer 13, pixel electrodes 14 are formed in a matrix manner. Furthermore, an alignment layer 8 made of polyimide resin and the like is formed so as to cover the pixel electrodes 14 and the surface of the TFT-side insulative layer 13 exposing between the pixel electrodes 14. The alignment layer 8 controls the alignment of the liquid crystal 15 on the alignment layer 8.

The transparent substrate 11 is made of a transparent material such as glass, plastic, and the like. In the TFT circuit layer 12, wires and TFT elements are connected. The wires are, for instance, made of metal such as aluminum, tantalum, titan, molybdenum, copper, and the like, or made of alloy of these metals. The TFT elements are made of amorphous silicon, polysilicon, and the like. The TFT-side insulative layer 13 is, for instance, made of an insulative material that is electrically insulative. The examples of this insulative material include a silicon compound such as silicon nitride and silicon oxide, and a resin material such as polyimide resin and acrylic resin. The pixel electrodes 14 are transparent conductive films made of ITO (Indium Tin Oxide) and the like, and these pixel electrodes 14 correspond to the respective pixels.

As shown in FIG. 1, the color filter substrate 20 is arranged such that a black matrix layer (color layer; protruding structure section forming layer) 22, a color layer (colorized layer) 23, and a stacked layer (protruding structure section) 24 are formed on a substrate 21. Also, an opposing electrode 25 is formed so as to entirely cover the black matrix layer 22, the color layer 23, and the stacked layer 24. Furthermore, an alignment layer 9 (not illustrated) that is made of polyimide and the like and controls the alignment of the liquid crystal 15 is formed so as to entirely cover the opposing electrode 25, an insulative resin film (insulative layer) 26, and protruding sections 27.

The substrate 21 is made of a transparent material such as glass and plastic. The black matrix layer 22 is provided for keeping the TFT elements away from the leakage of light at around the gap between the pixel electrodes 14 on the TFT array substrate 10 and from the outside light, so as to improve the display contrast of the liquid crystal display apparatus 1. On this account, the black matrix layer 22 is formed in a matrix manner on the substrate 21, so that the black matrix layer 22 faces (i) the gaps between the pixel electrodes 14 and (ii) the TFT elements, when the TFT array substrate 10 and the color filter substrate 20 are superposed so as to face each other. The black matrix layer 22 is made of a material such as black photosensitive resin in which carbon fine particles are dispersed in photosensitive resin, a metal film made of chromium, molybdenum and the like, and photosensitive resin colored using colorants having colors like red and blue.

The color layer 23 includes, as shown in FIG. 1, a first color layer (color layer, protruding structure section forming layer) 23a, a second color layer (color layer, protruding structure section forming layer) 23b, and a third color layer (color layer, protruding structure section forming layer). These first to third color layers 21a-23c are colored with, for instance, red (R), green (G), and blue (B) or cyan (C), magenta (M), and yellow (Y). A color image is reproduced by appropriately mixing these colors. The color layer 23 faces the pixel electrodes 14 formed on the TFT array substrate 10, and the color layers 23a-23c correspond to the respective pixel electrodes 14, in an one-by-one manner.

In this manner, on the surface of the substrate 21, the black matrix layer 22 and the color layer 23 are adjacent to each other, so as to cover the entire surface of the substrate 21, as shown in FIG. 1. Note that, at the border between the black matrix layer 22 and the color layer 23, the end of the color layer 23 is superposed onto the end of the black matrix layer 22, in order to prevent the leakage of light. In this manner, at the borders between the color layers 23a-23c and the borders between the color layers 23a-23c and the black matrix layer 22, parts of these layers are superposed onto each other, so that color layer superposition sections 28 are formed in order to prevent the leakage of light.

Figure 3:
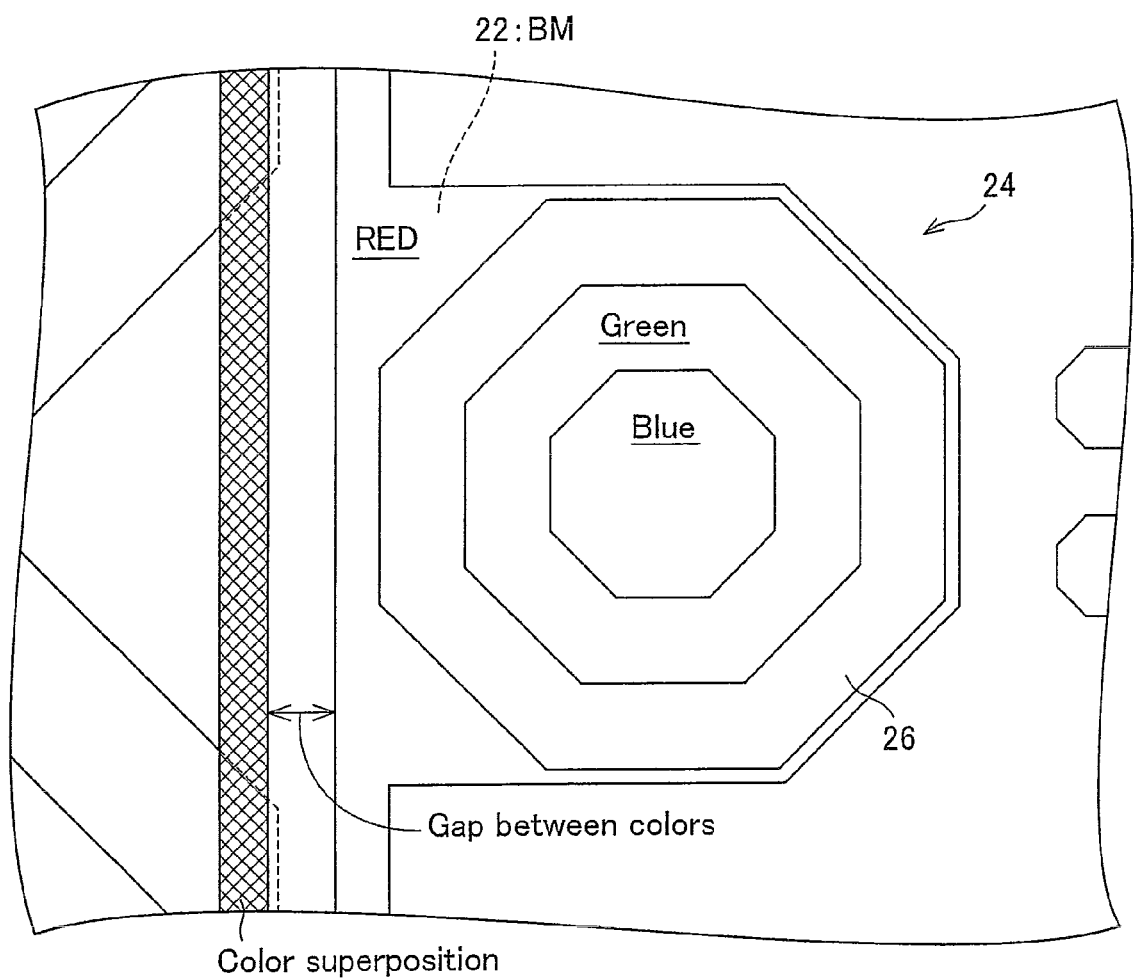
FIG. 3 is a plan view showing an example of how a protruding structure section of the color filter substrate is structured, so as not necessarily to correspond to FIG. 1.
Figure 4:
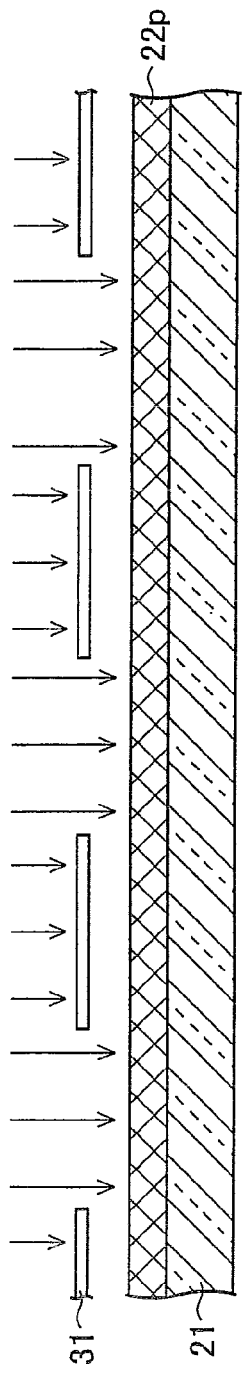
FIGS. 4(*a*)-4(*d*) are cross sections showing a manufacturing process of the color filter substrate.
Figure 4:
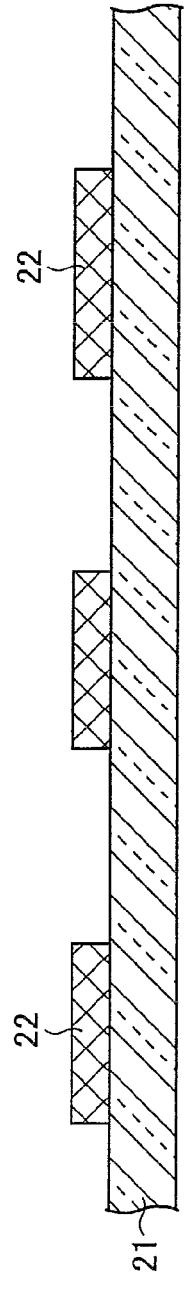
Figure 4:
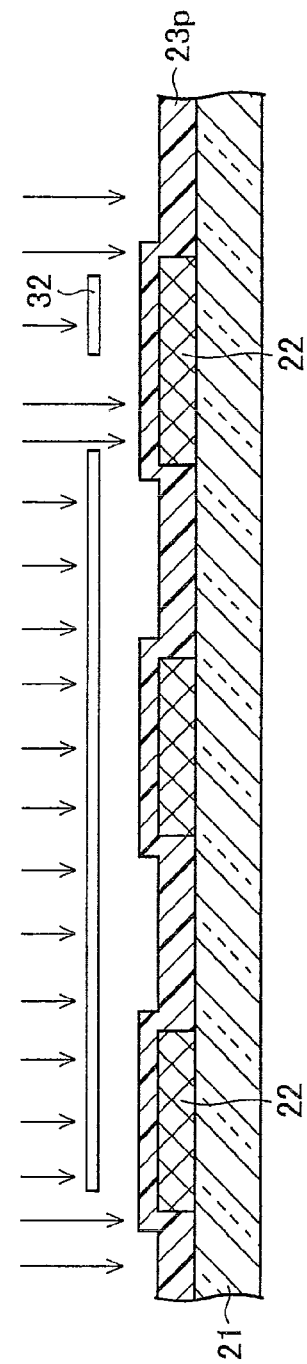
Figure 4:
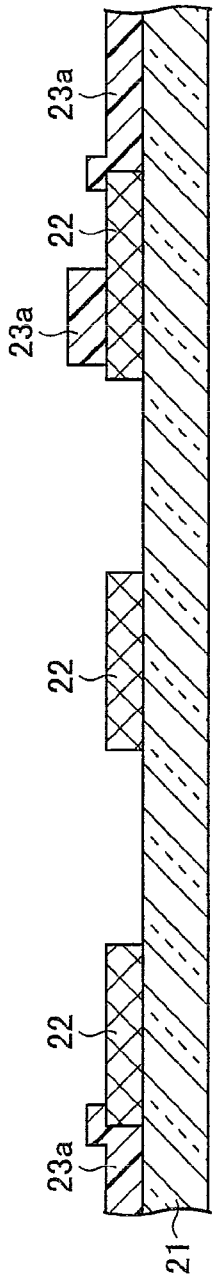
Figure 6:
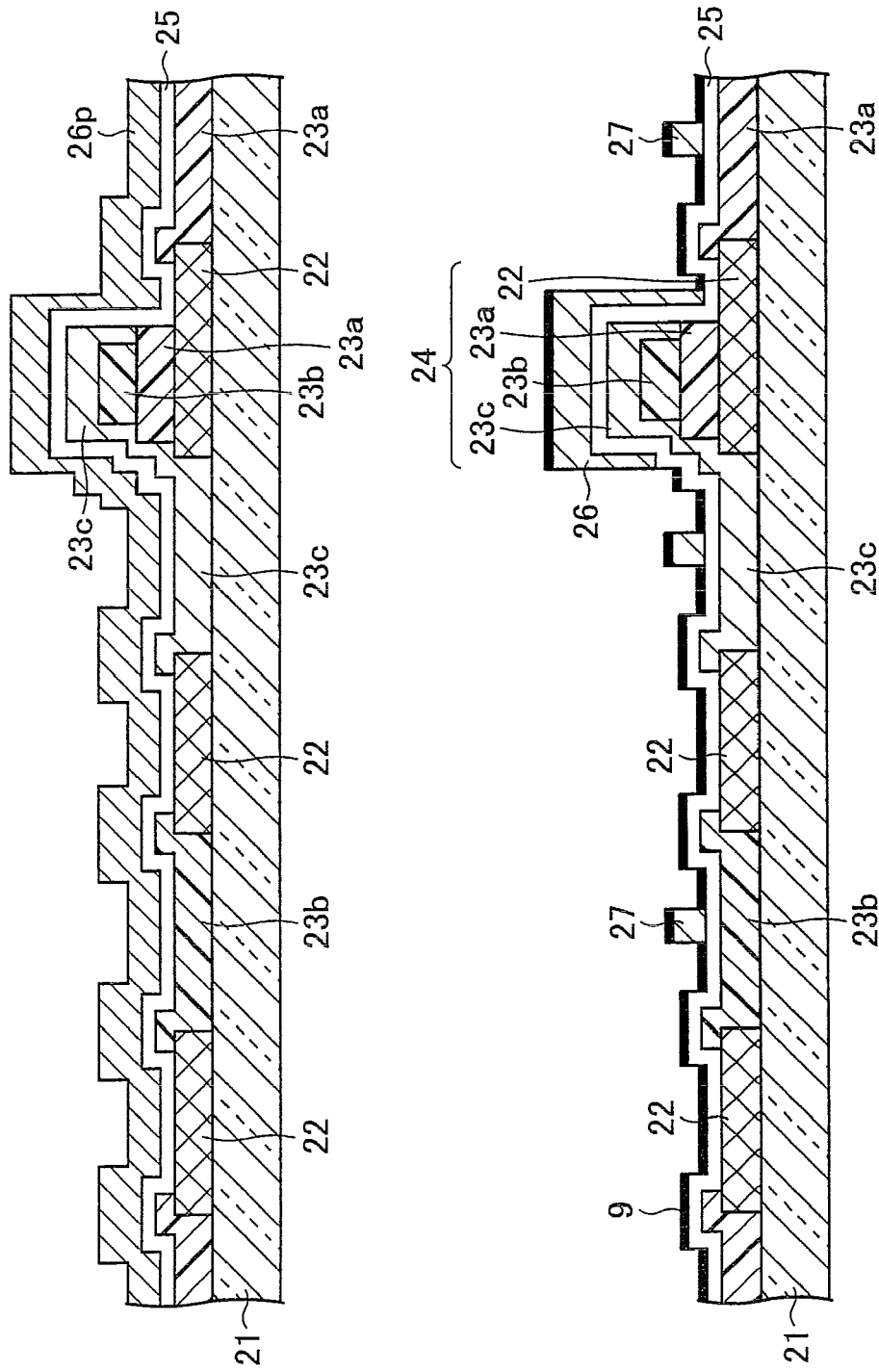
FIGS. 6(*a*) and 6(*b*) are cross sections further showing the manufacturing process of the color filter substrate.

As shown in FIGS. 1-3, the stacked layer 24 is formed by stacking, on the black matrix layer 22, the first color layer 23a, the second color layer 23a, and the third color layer 23c. On this account, the stacked layer 24 protrudes toward the TFT array substrate 10, in comparison with the black matrix layer 22 and the color layer 23 (hereinafter, these layers are referred to as other layers) that do not constitute the stacked layer 24.

The stacked layer 24 functions as a part of a spacer for keeping the distance between the color filter substrate 20 and the TFT array substrate 10 to be consistent. In the present embodiment, the stacked layer 24 is formed on the black matrix layer 22, so that a light transmitting area on the color filter substrate 20 is not obstructed by the stacked layer 24. The transmittance of the light passing through the transmitting area is therefore not decreased. It is not necessary to form the stacked layer 24 on the whole surface of the black matrix layer 22 on the substrate 21, as long as the stacked layer 24 is formed on a predetermined part of the black matrix layer 22. For instance, a part of the black matrix layer 22 is selected, and on this selected part, the first to third color layers are stacked as one unit, i.e. the first to third color layers are provided so as to form the stacked layer 24.

The opposing electrode 25 is formed so as to entirely cover the surfaces of the black matrix layer 22, the color layer 23 including the first to third color layers 23a-23c, and the stacked layer 24. The opposing electrode 25 can be made of any types of materials. For example, the opposing electrode 25 is formed by a transparent conductive film made of ITO, IZO (Indium Zinc Oxide), zinc oxide, tin oxide, and the like, which has predetermined resistance and transmittance.

Each of the insulative resin film 26 and the protruding sections 27 is made of electrically insulative material, for instance, organic insulative resin such as polyimide-based or acrylic negative photosensitive resin and acrylic or phenol-novolac-based positive photosensitive resin, and an inorganic silicon compound such as silicon nitride and silicon oxide. When the inorganic silicon compound material is adopted, it is necessary to form the insulative resin film 26 and the protruding sections 27 by a photolithography step and an etching step such as dry etching. Note that, the insulative resin film 26 and the protruding sections 27 are preferably made of an identical material, in view of the simplification of the manufacturing process.

The insulative resin film 26 is formed so as to cover at least the entire surface of the opposing electrode 25 (hereinafter, this surface will be referred to as protruding surface) that covers the entire surface of the stacked layer 24 that includes the black matrix layer 22 and the first to third color layers 23a-23c. That is to say, on the part of the opposing electrode 25 that covers the stacked layer 24, the insulative resin film 26 is formed so as to cover at least an area (top portion) facing the TFT array 10 and also an area along the direction of stacking the first to third color layers 23a-23c.

As described above, the stacked layer 24 protrudes in comparison with the other layers. On this account, the distance between (i) a part of the opposing electrode 25 on the top portion of the stacked layer 24, the top portion facing the TFT array substrate 10, and (ii) the pixel electrode 14 on the TFT array substrate 10 is shorter than the distance between (iii) parts of the opposing electrode 25 on the other layers such as the first to third color layers 23a-23c and the color layer superposition sections 28 and (iv) the pixel electrode 14. For this reason, the opposing electrode 25 is liable to short-circuit with the pixel electrode 14 on account of a conductive matter, in/around a space between the pixel electrode 14 and the part of the opposing electrode 25 corresponding to the top portion of the stacked layer 24. This short circuit between the opposing electrode 25 and the pixel electrode 14 may lower the yield of the liquid crystal display apparatus 1.

To prevent the short circuit between the opposing electrode 25 and the pixel electrode 14 on account of the conductive matter, the liquid crystal display apparatus 1 is provided with the insulative resin film 26 that covers a part of the opposing electrode 25 covering the stacked layer 24. This insulative resin film 26 is preferably at least 0.1 μm thick, in order to prevent the conductive matter from penetrating the insulative resin film 26.

In this manner, the insulative resin film 26 is provided for preventing the short circuit between the opposing electrode 25 and the pixel electrode 14 on account of the conductive matter. Therefore, the insulative resin film 26 that covers the part of the opposing electrode 25 covering the stacked layer 24 is preferably thicker than insulative films (e.g. the alignment layer 9) covering the other layers (the other surfaces) such as the black matrix layer 22 and the color layer 23.

The protruding sections 27 are formed on the surface of parts of the opposing electrode 25 on which the insulative resin film 26 is not formed. The protruding sections 27 are provided for controlling the alignment of the liquid crystal 15 enclosed between the TFT array substrate 10 and the color filter substrate 20. For this reason, the protruding sections 27 are formed on parts of the opposing electrode 25 on the first to third color layers 23a-23c constituting the color layer 23.

In the liquid crystal display apparatus 1 being this described, as shown in FIG. 1, the TFT array substrate 10 and the color filter substrate 20 are arranged so as to face each other in such a manner as to cause the top portion of the insulative resin film 26 covering the part of the opposing electrode 25 on the stacked layer 24 to be in touch with the surface of the pixel electrode 14. That is to say, (i) the stacked layer 24, (ii) the part of the opposing electrode 25 covering the top portion of the stacked layer 24, and (iii) the insulative resin film 26 function as a spacer 29 that maintains the cell gap in which the liquid crystal 15 is enclosed. To suitably keep this cell gap between the TFT array substrate 10 and the color filter substrate 20, the insulative resin film 26 covering the top portion of the stacked layer 24 is preferably 2 μm thick or less.

To prevent the short circuit between the opposing electrode 25 and the pixel electrode 14 and to function as a part of the spacer 29 as described above, the thickness of the insulative resin film 26 preferably falls within the range between 0.1 m and 2 μm.

In this manner, the stacked layer 24, the part of the opposing electrode 25 covering the top portion of the stacked layer 24, and the insulative resin film 26 function as the spacer 29, so that a step of, for instance, dispersing spacer members such as plastic bead and glass fiber is unnecessary. This makes it possible to simplify the manufacturing process and reduce the manufacturing costs. Note that, being similar to the protruding sections 27, the spacer 29 also controls the alignment of the liquid crystal 15, thereby preventing the display failure due to the disorder of the alignment of the liquid crystal, which often occur in the vicinity of the spacer.

As described above, in the color filter 20, not only the top portion of the opposing electrode 25 covering the stacked layer 24 but also the remaining parts of the opposing electrode 25 covering the stacked layer 24 are covered with the insulative resin film 26. On this account, it is possible to prevent the pixel electrode 14 from short-circuiting, on account of the conductive matter, with the surface (hereinafter, side surface)

of the opposing electrode 25, the side surface being close to the pixel electrode 14 on the color filter substrate 20 and covering the stacked layer 24 along the direction of stacking the color layers 23a-23c.

A method of manufacturing the color filter substrate 20 will be specifically described in reference to FIGS. 4(a)-4(d), 5(a)-5(c), and 6(a)-6(b). FIGS. 4(a)-4(d), 5(a)-5(c), and 6(a)-6(b) are cross sections illustrating a manufacturing process of the color filter substrate 20.

As shown in FIG. 4(a), for instance, on the substrate 21, a black photosensitive resin layer 22p is formed by applying a black photosensitive liquid by a spin coat method and drying the liquid. Subsequently, the black photosensitive resin layer 22p is exposed to light using a photo mask 31 and then developed, and consequently the black matrix layer 22 is formed as shown in FIG. 4(b). In the meanwhile, areas on which the black photosensitive resin layer 22p is formed but not being subjected to the exposure are used as openings where the first color layer 23a, the second color layer 23b, and the third color layer 23c that constitute the color layer 23 shown in FIG. 1 will be formed.

Subsequently, as shown in FIG. 4(c), to the whole surface of the substrate 21 on which the black matrix layer 22 has been formed, a photosensitive resin liquid for the first color layer 23a is applied by the spin coat method, and then the applied liquid is dried. As a result a first resin layer 23p is formed. Then the first resin layer 23p is exposed to light and developed, using a photo mask 32 with which an area on the substrate 21 where the first color layer 23a will be formed, the end of the black matrix layer 22 neighboring to the area, and an area on the black matrix layer 22 where the stacked layer 24 (see FIG. 1) will be formed are exposed to light. With this, as shown in FIG. 4(d), the first color layer 23a is formed on the opening for the first color layer 23a, on the end of the black matrix layer 22 neighboring to the opening, and on the area of the black matrix layer 22 where the stacked layer 24 will be formed, and then parts of the first resin layer 23p where the exposure is not performed are removed.

Subsequently, as in a manner similar to the formation of the first color layers 23a, the second color layer 23b and the third color layer 23c are successively formed as shown in FIGS. 5(a) and 5(b). That is to say, after a photosensitive resin liquid for the second color layer 23b is applied and dried, the exposure and development are performed using a photo mask. With this, as shown in FIG. 5(a), the second color layers 23b are formed on the opening for the second color layer 23b, on the end of the black matrix layer 22 neighboring to the opening, and on the first color layer 23a on the black matrix layer 22 where the stacked layer 24 will be formed. On this occasion, the layer of the photosensitive resin liquid, which has been applied to the unexposed areas, is removed. The second color layer 23b which becomes a part of the stacked layer 24 is formed so as to be narrower than the first color layer 23a.

Subsequently, in the same manner as above, a photosensitive resin liquid for the third color layer 23c is applied and dried, and then the exposure and development are performed using a photo mask. With this, as shown in FIG. 5(b), the third color layer 23c is formed on the opening for the third color layer 23c, on the end of the black matrix layer 22 neighboring to the opening, and on the first and second color layers 23a and 23b that become parts of the stacked layer 24. On this occasion, the layer of the photosensitive resin liquid, which has been applied to the unexposed areas, is removed. At this stage, as shown in FIG. 5(b), the third color layer 23c is adjacent to the black matrix layer 22 constituting the stacked layer 24. On this account, the third color layer 23c is formed so as to cover (i) the third color layer 23c formed on the opening that is formed on the substrate 21 and for the third color layer 23c, and (ii) the black matrix layer 22 and the first and second color layers 23a and 23b that become the parts of the stacked layer 24.

In this manner, on the substrate 21, the color layer 23 and the stacked layer 24 made up of the black matrix layer 22 and the first to third color layers are formed. Note that, as described above, (i) the first to third color layers 23a-23c constituting the color layer 23 formed on the substrate 21 and (ii) the first to third color layers 23a-23c constituting the stacked layer 24 are formed by an identical process.

Subsequently, as shown in FIG. 5(c), on the color layer 23 and the stacked layer 24, the opposing electrode 25 is formed by, for instance, vapor-depositing a transparent conductive film by sputtering. Then on this opposing electrode 25, a photosensitive insulative resin layer (photosensitive resin layer) 26p is formed by applying, by the spin coat method, a photosensitive insulative resin liquid and drying this liquid. In the next place, the photosensitive insulative resin layer 26p is, using a photo mask 33, exposed to light and developed, in such a manner as to expose (i) an area covering the entire surface of the part of the opposing electrode 25 covering the stacked layer 24 and (ii) an area on parts of the color layer 23 where the protruding sections 27 are supposed to be formed.

With this, as shown in FIG. 6(b), the insulative resin film 26 is formed on the entire surface of the part of the opposing electrode 25 covering the stacked layer 24, while the protruding sections 27 are formed in the parts on the color layer 23, and consequently the photosensitive insulative resin layer 26p formed in the unexposed areas is removed. In this manner, the insulative resin film 26 and the protruding sections 27 are formed by an identical manufacturing process. Note that, the insulative resin film 26 may be formed by performing a process (a) by which a photosensitive insulative resin liquid is applied and dried and the photosensitive insulative resin layer 26p is exposed to light and developed. Also, in order to obtain a suitable height, the insulative resin film 26 may be formed as a combination of two or more layers, by performing the process (a) twice or more.

Then on the surfaces of the opposing electrode 25, the insulative resin film 26, and the protruding sections 27, the alignment layer 9 is formed. Consequently, the color filter substrate 20 is obtained. Note that, although the black matrix layer 22, the first color layer 23a, the second color layer 23b, the third color layer 23c, and the insulative resin film 26 are formed by applying the resins by the spin coat method, other methods such as a dry film method, a die coat method, and a printing method may be used for the application of the resins.

To obtain the liquid crystal display apparatus 1 shown in FIG. 1, the TFT array substrate 10, in which the TFT circuit layer 12, the pixel electrodes 14, and the alignment layer 8 are formed, is pasted, using a sealing material and the like, onto the color filter substrate 20 in which the alignment layer 9 is formed. That is to say, the color layer 23 and the pixel electrodes 14 are aligned so as to face each other, and a cell gap is formed by causing the pixel electrode 14 to be in touch with the insulative resin film 26 covering the top portion of the part of the opposing electrode 25 formed on the stacked layer 24. With this, the color filter substrate 20 and the TFT array substrate are fixed. Then the liquid crystal 15 is injected to a space between the color filter substrate 20 and the TFT array substrate, and the opening through which the liquid crystal 15 is injected is sealed by a sealing material (not illustrated). As a result, the liquid crystal display apparatus 1 shown in FIG. 1 is obtained.

Although the color filter substrate 20 of the present embodiment is provided with the black matrix layer 22, this black matrix layer 22 is not prerequisite. That is, in place of the black matrix layer 22, not less than two color layers having different colors may be stacked for the sake of shading. Also, it is possible to adopt such an arrangement that the color filter substrate 20 is not provided with the black matrix layer 20, so that the shading is performed by the TFT circuit layer 12 provided on the TFT array substrate 10 side. The stacked layer 24 of the present embodiment includes the black matrix layer, the first color layer 23a, the second color layer 23b, and the third color layer 23c. However, the stacked layer 24 may include at least one of these layers and protrude in comparison with the black matrix layer 22 and the color layer 23 that are formed on the substrate 21 but do not constitute the stacked layer 24.

In the present embodiment, as shown in FIG. 1, the shape of the stacked layer 24 at cross section is rectangular. However, the shape at cross section may be triangular, semicircular, trapezoidal, and the like. That is, the shape of the stacked layer 24 is not limited as long as the stacked layer 24 protrudes in comparison with the black matrix layer 22 and the color layer 23 formed on the substrate 21, and the entire surface of the protruding stacked layer 24 is covered with the insulative resin film 26.

Also, in the present embodiment, as shown in FIG. 1, the pixel electrode 14 is in touch with the top portion of the insulative resin film 26 covering the part of the opposing electrode 25 on the stacked layer 24. The present invention is, however, not limited to this arrangement. The top portion of the insulative resin film 26 of the color filter substrate 20 may be in touch with the TFT array substrate 10, in an area where the pixel electrode 14 is not provided.

Embodiment 2

Figure 9:
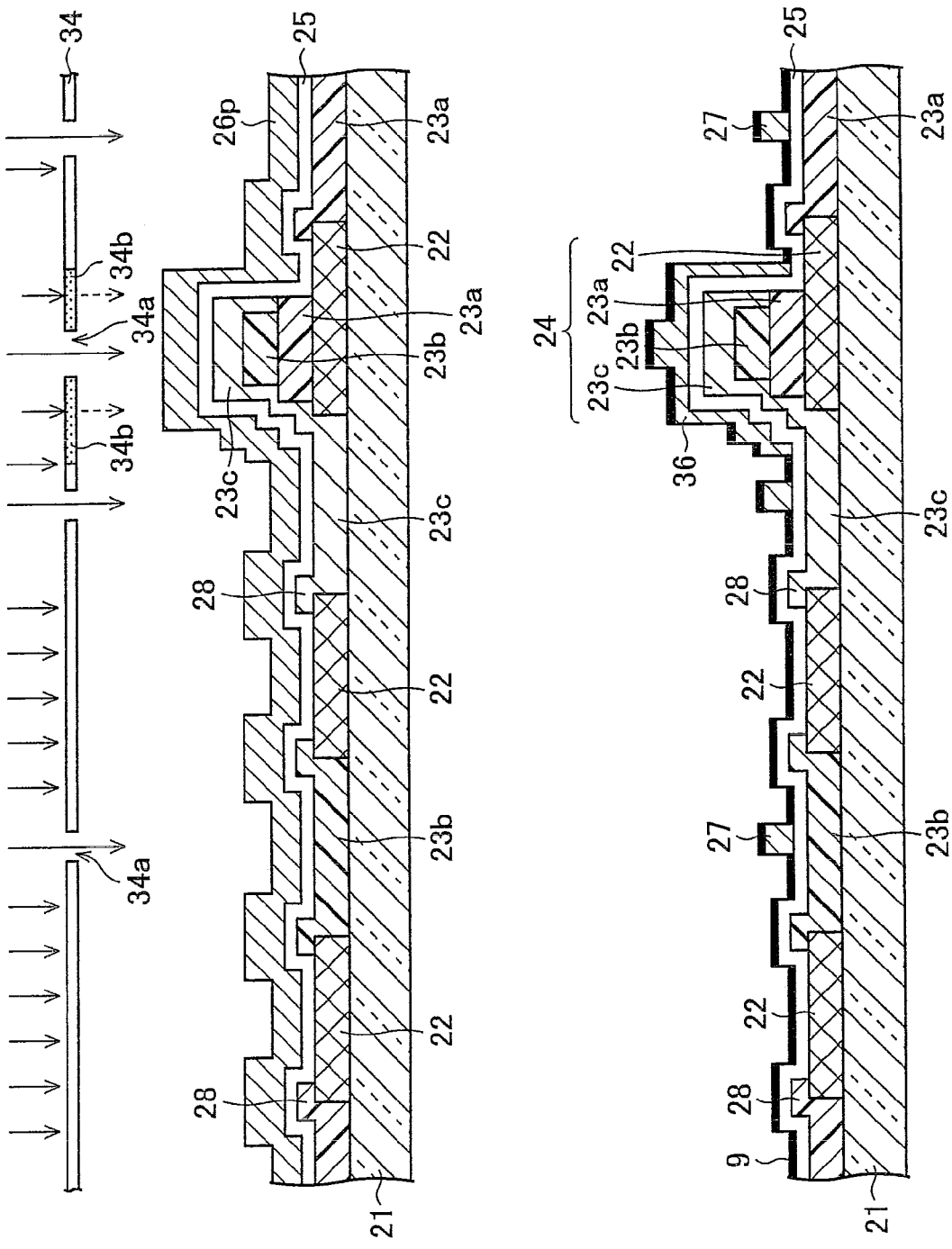
FIGS. 9(*a*) and 9(*b*) are cross sections showing another manufacturing process of the color filter substrate.

Another embodiment of the present invention will be described in reference to FIGS. 7-9. By the way, members having the same functions as those described in Embodiment 1 with figures are given the same numbers, so that the descriptions are omitted for the sake of convenience.

Being similar to the liquid crystal display apparatus illustrated in Embodiment 1, a liquid crystal display apparatus of the present embodiment is arranged such that an insulative resin film is provided on a stacked layer of a color filter substrate, and the stacked layer and the insulative resin film function as a spacer so that a cell gap is formed. The cell gap is formed with the spacer being elastically deformed to an appropriate degree, by suitably setting the size of the contact region between the insulative resin film on the color filter substrate and a pixel electrode of a TFT array substrate.

When the contact region between the insulative resin film and the pixel electrode is too large, the spacer rarely elastically deforms, so that the cell gap cannot be easily controlled. As a result, the following problems occur: low-temperature bubbles that are formed in the cell gap; and underpart swelling that is nonuniformity of brightness occurs because the liquid crystal is biased downwards by gravitation when the liquid crystal display apparatus props against a wall. On the other hand, when the contact region between the insulative resin film and the pixel electrode is too small, the insulative resin film constituting the spacer is crushed by a slight pressure by, for instance, a finger, and consequently visual nonuniformity occurs. For these reasons, the contact region between the insulative resin film of the color filter substrate and the TFT array substrate must have an appropriate size.

Figure 7:
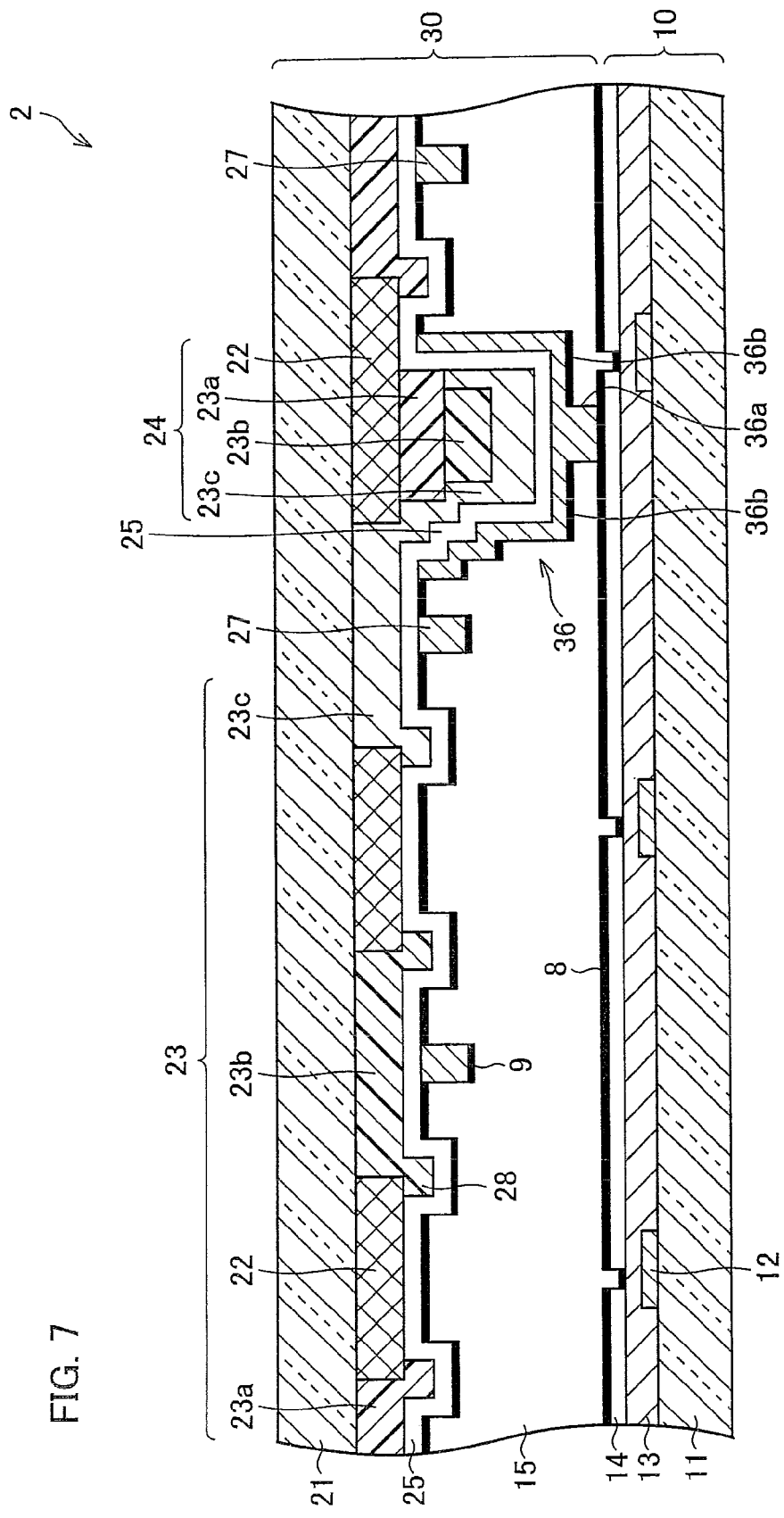
FIG. 7 is a cross section of an embodiment of a liquid crystal display apparatus including another color filter substrate of the present invention.

The liquid crystal display apparatus 2 of the present embodiment is shown in FIG. 7. This liquid crystal display apparatus 2 is provided with a color filter substrate 30 including an insulative resin film (insulative layer) 36, in place of the color filter substrate 20 including the insulative resin film 26, which is included in the liquid crystal display apparatus 1 shown in FIG. 1.

As shown in FIG. 7, the liquid crystal display apparatus 2 is arranged such that the insulative resin film 36 covers a part of the opposing electrode 25 covering the stacked layer 24. Also, a part of the insulative resin film 36 opposing to the TFT array substrate 10 is thicker than the remaining parts of the insulative resin film 36. That is, in an area (hereinafter, contact area) 36a that is in touch with the pixel electrode 14 on the TFT array substrate 10, the thickness of the insulative resin film 36 is relatively thick. On the other hand, in an area (non-contact area) 36b that is not in touch with the pixel electrode 14, the thickness of the insulative resin film 36 is relatively thin. In this manner, the insulative film 36 has two stages of thickness.

With this arrangement, the cell gap between the TFT array substrate 10 and the color filter substrate 30 is sustained at the contact area 36a of the insulative resin film 36. In this manner, the contact area 36a and the non-contact area 36b of the insulative resin film 36 are formed, so that the size of the contact area 36a can be suitably set even if the size of the area of the stacked layer 24 opposing to the TFT array substrate 10 is large. With this, the size of the contact region between the insulative resin film 36 and the pixel electrode 14 is optimized.

In the meanwhile, at the non-contact area of the insulative resin film 36, the short circuit between the part of the opposing electrode 25 on the stacked layer 24 and the pixel electrode 14, which is caused by a conductive member, is prevented. That is to say, a space between the opposing electrode 25 on the stacked layer 24 and the pixel electrode 14 is narrower than the distance between a part of the opposing electrode 25 on the color layer 23 and the pixel electrode 14 on the TFT array substrate 10, so that short circuit on account of the conductive matter tends to occur in the space. To prevent the short circuit on account of the conductive matter between the part of the opposing electrode 25 on the stacked layer 24 and the pixel electrode 14, the liquid crystal display apparatus 2 is arranged such that the insulative resin film 36 is formed on the entire surface of the stacked layer 24. On this account, the short circuit between the opposing electrode 25 and the pixel electrodes 14 does not occur neither in the contact area 36a nor in the non-contact area 36b.

In this manner, using the insulative resin film 36 having the contact area and the non-contact area, it is possible to optimize the size of the contact region between the pixel electrode 14 on the TFT array substrate 10 and the insulative resin layer 36 that opposes to the TFT array substrate 10 and is on the part of the opposing electrode 25 on the stacked layer 24. On this account, the spacer is allowed to elastically deform, and hence the cell gap between the TFT array substrate 10 and the color filter substrate 30 is suitably formed.

Now, a method of manufacturing the color filter substrate 30 is described in reference to FIGS. 8(a) and 8(b). Note that the steps until forming the insulative resin film 36 are identical with those described in the manufacturing steps of the color filter substrate 20 illustrated in Embodiment 1, so as to be omitted here.

As shown in FIG. 6(b), after forming the insulative resin film 26 covering the stacked layer 24, a photosensitive resin liquid made of acrylic resin and the like is applied and dried by, for instance, a spin coat method, in such a manner as to cover the opposing electrode 25, the protruding sections 27, and the insulative resin film 26. Further, an insulative resin layer 6p is formed (see FIG. 8(a)). This resin layer 6p may be made of a photosensitive insulative resin liquid identical with that for the insulative resin film 26.

Subsequently, the exposure and development of the resin layer 6p is performed using the photo mask 35, in such a manner as to expose a region where the contact area 36a of the insulative resin film 36 shown in FIG. 7 will be formed. On this account, as FIG. 8(b) shows, the contact area 36a is formed on a part of the insulative resin film 26, and consequently the insulative resin film 36 is formed. In other words, according to the above-described manufacturing method, the insulative resin film 36 is made up of the insulative resin film 26 shown in FIG. 6(b) and the contact area 36a. In the meanwhile, the photosensitive insulative resin layer 6p applied to the areas not being exposed to light is removed from the opposing electrode 25, so that the opposing electrode 25 is exposed to the outside.

In this manner, the non-contact area 36b (insulative resin film 26) of the insulative resin film 36 and the contact area 36a of the insulative resin film 36, these areas being shown in FIG. 7, are successively formed, so that the color filter substrate 30 including the insulative resin film 36 having two-staged thickness is obtained.

Alternatively, it is possible to obtain the color filter substrate 30 by integrally forming the contact area 36a and the non-contact area 36b of the insulative resin film 36. A method of manufacturing the color filter substrate 30 in this case is described in reference to FIGS. 9(a) and 9(b). Note that, the steps until forming the opposing electrode 25 are identical with the steps of manufacturing the color filter substrate 20 shown in Embodiment 1 in reference to FIGS. 4(a)-4(d) and 5(a)-5(c), so that the description on these steps is omitted.

On the first to third color layers 23a-23c and the stacked layer 24 formed on the substrate 21, the opposing electrode 25 is formed. Subsequently, a photosensitive resin liquid is applied by the spin coat method and dried, so that, as shown in FIG. 9(a), a photosensitive insulative resin layer 26p is formed. Then the photosensitive insulative resin layer 26p is exposed to light and developed using the photo mask 34, in such a manner as to expose the area covering the entire surface of the part of the opposing electrode 25 on the stacked layer 24 and the areas on the color layer 23 where the protruding sections 27 shown in FIG. 27 are formed. On this occasion, in order to cause light exposure amounts to be different between areas on the top portion of the part of the opposing electrode 25 on the stacked layer 24, for instance, a slit mask having an exposure section 34a and a half-exposure section 34b, at these sections 34a and 34b the light exposure amounts being different, is adopted as the photo mask 34. With this photo mask 34, the exposure at the half-exposure section 34b can be performed with a smaller light exposure amount than the exposure at the exposure section 34a.

Thus, as FIG. 8(b) shows, the insulative resin film 36 is formed on the entire surface of the part of the opposing electrode 25 covering the stacked layer 24, and the thickness of the part of the insulative resin film 36 on the top portion of the part of the opposing electrode 25 on the stacked layer 24 is two-staged. The thicker part of the insulating resin film 36 is the contact area, and this contact area is formed by performing the exposure using the exposure section 33a of the photo mask 34. On the other hand, the thinner part of the insulative resin film 36 is the non-contact area, and this non-contact area is formed by performing the exposure using the half-exposure section 34b of the photo mask 34.

On the color layer 23, the protruding sections 27 are formed. These protruding sections 27 may be formed using either the exposure section 34a or the half-exposure section 34b of the photo mask 34. In the meanwhile, the photosensitive insulative resin layer 26p formed on the areas not being exposed to light is removed from the opposing electrode 25, so that the opposing electrode 25 is exposed to the outside.

In this manner, the insulative resin film 36 and the protruding sections 27 are formed in an identical process. Subsequently, on the opposing electrode 25, the insulative resin film 36, and the protruding sections 27, the alignment layer 9 is formed, and consequently the color filter substrate 30 is obtained.

Note that, the protruding sections 27 may be formed concurrently with the non-contact area 36b (insulative resin film 26) in the step of forming the non-contact area 36b. Also, the protruding sections 27 may be formed concurrently with the contact area 36a in the step of forming the contact area 36a.

As described above, the insulative resin film 36 of the color filter substrate 30 may be, as shown in FIGS. 8(a) and 8(b), formed in such a manner that the contact area 36a and the non-contact area 36b are formed one after another, or the insulative resin film 36 may be, as shown in FIGS. 9(a) and 9(b), formed in such a manner that the contact area 36a and the non-contact area 36b are concurrently formed.

As discussed in Embodiment 1, the liquid crystal display apparatus 2 is obtained by pasting the color filter substrate 30 onto the TFT array substrate 10 by using, for instance, a sealing material, after the TFT array substrate 10 in which the alignment layers 8 and 9 are formed is aligned with the color substrate 30. On this occasion, these substrates are fixed by causing the contact area on the color filter substrate 30 to be in touch with the pixel electrode 14 of the TFT array substrate 10 (see FIG. 7). Then the liquid crystal 15 is enclosed in a space between the color filter substrate 30 and the TFT array substrate 10, and the opening for injecting the liquid crystal 15 is sealed by a sealing material.

In the present embodiment, the thickness of the part of the insulative resin film 36 opposing to the TFT array substrate 10 is two-staged. However, the insulative resin film in the area opposing to the TFT array substrate 10 may be not less than three-staged in thickness.

The distance between the parts of the opposing electrode 25 on the color layer superposition section 28 and the pixel electrode 14 on the TFT array substrate 10 is narrower than the distance between the pixel electrode 14 and the part of the opposing electrode 25 on the color layer 23. On this account, in order to prevent the short circuit between the opposing electrode 25 and the pixel electrode 14 on account of the conductive matter, an insulative resin film may be formed on the color layer superposition section 28 and on the superposed section side.

Embodiment 3

Figure 10:
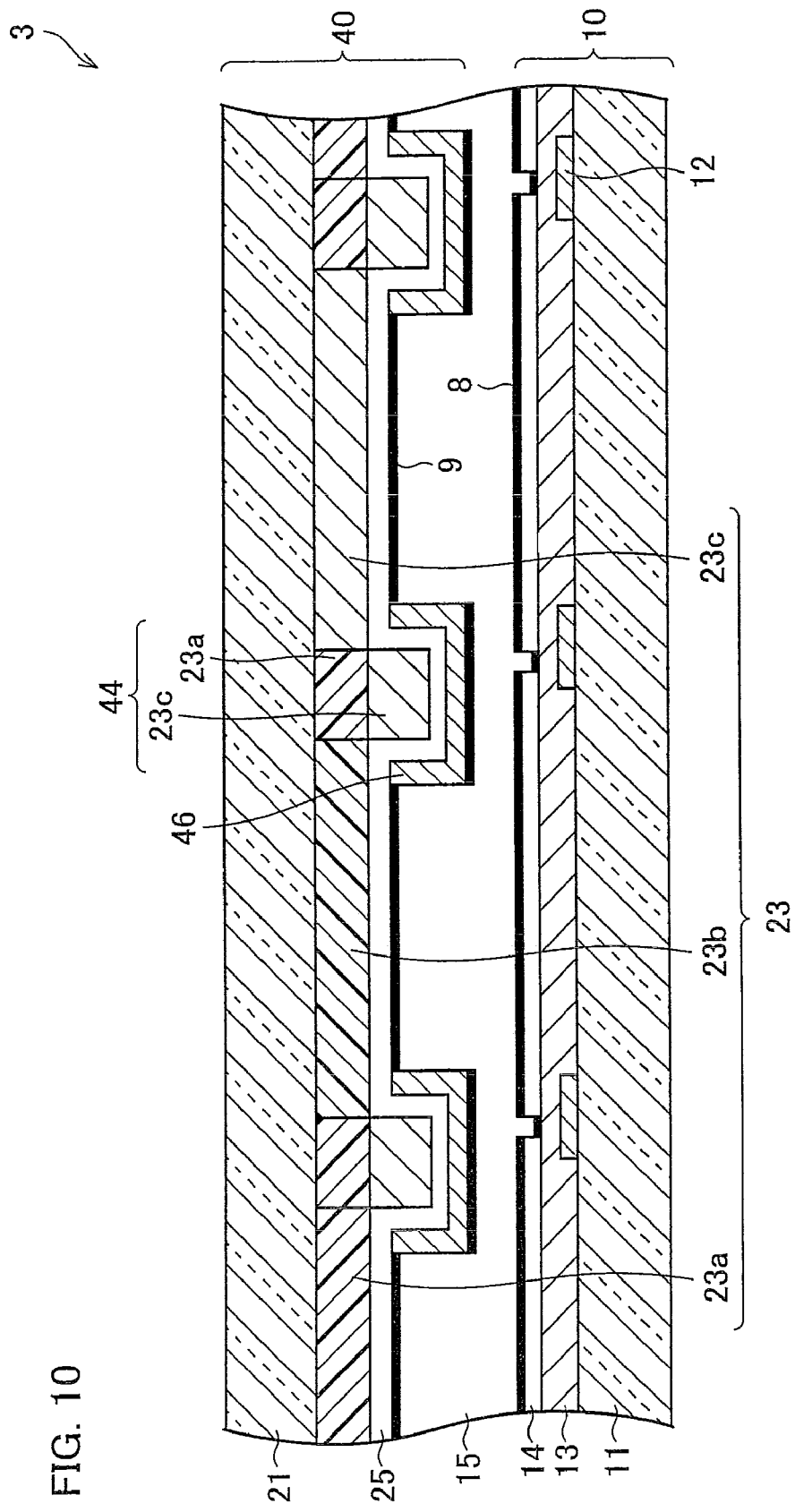
FIG. 10 is a cross section of an embodiment of a liquid crystal display apparatus including a further color filter substrate of the present invention.
Figure 12:
FIGS. 12(a)-12(d) are cross sections further showing the manufacturing process of the color filter substrate.
Figure 12:
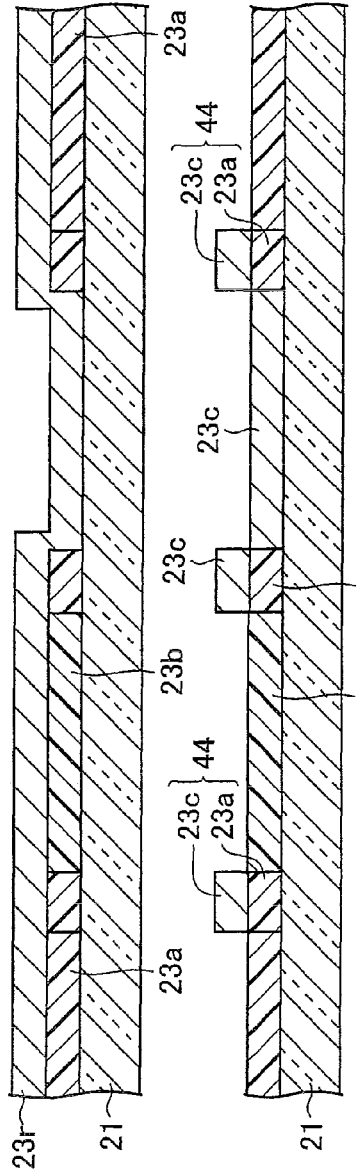
Figure 12:
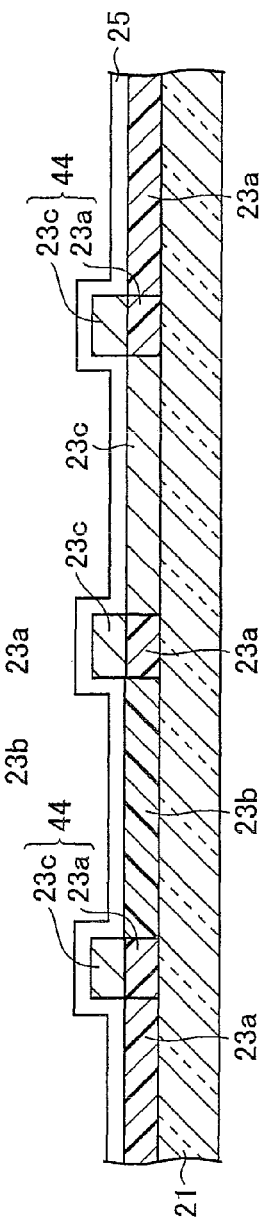
Figure 12:
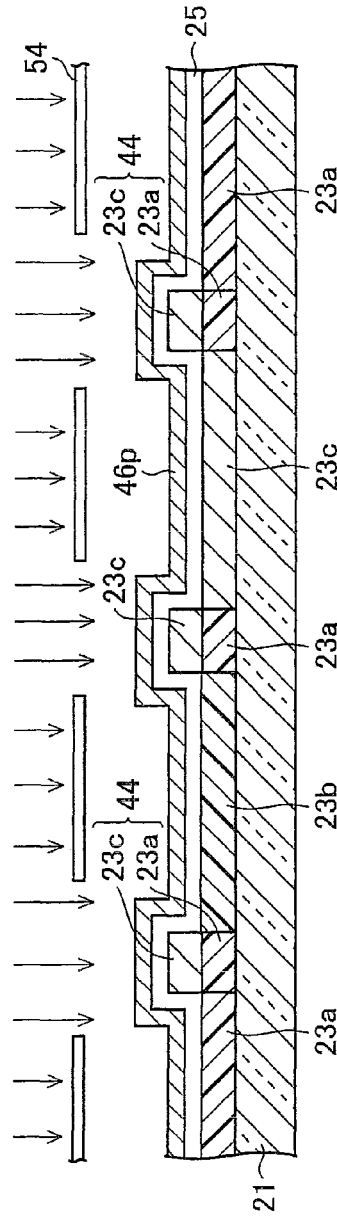
Figure 13:
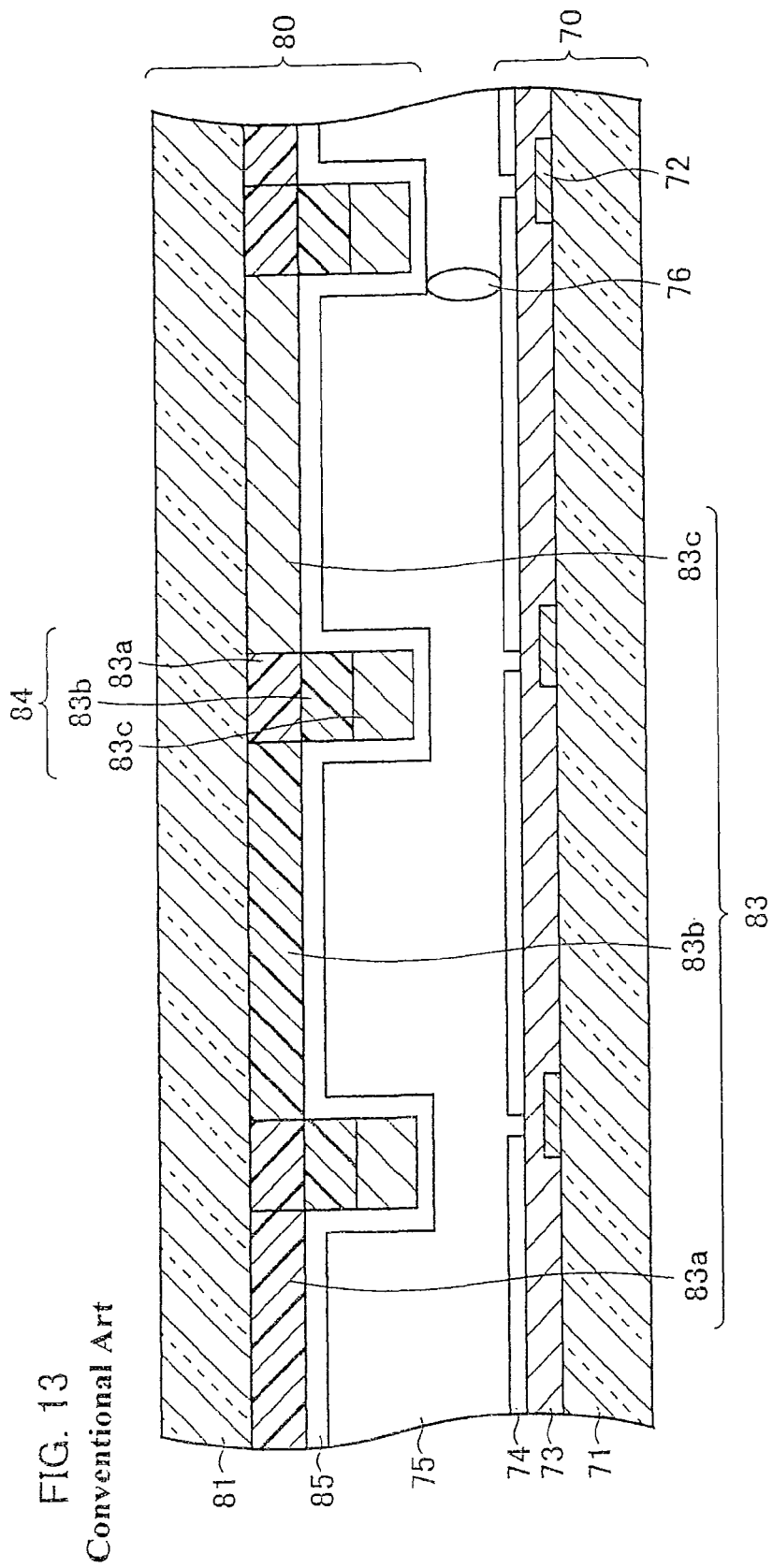
FIG. 13 is a cross section showing a conventional liquid crystal display apparatus.
Figure 14:
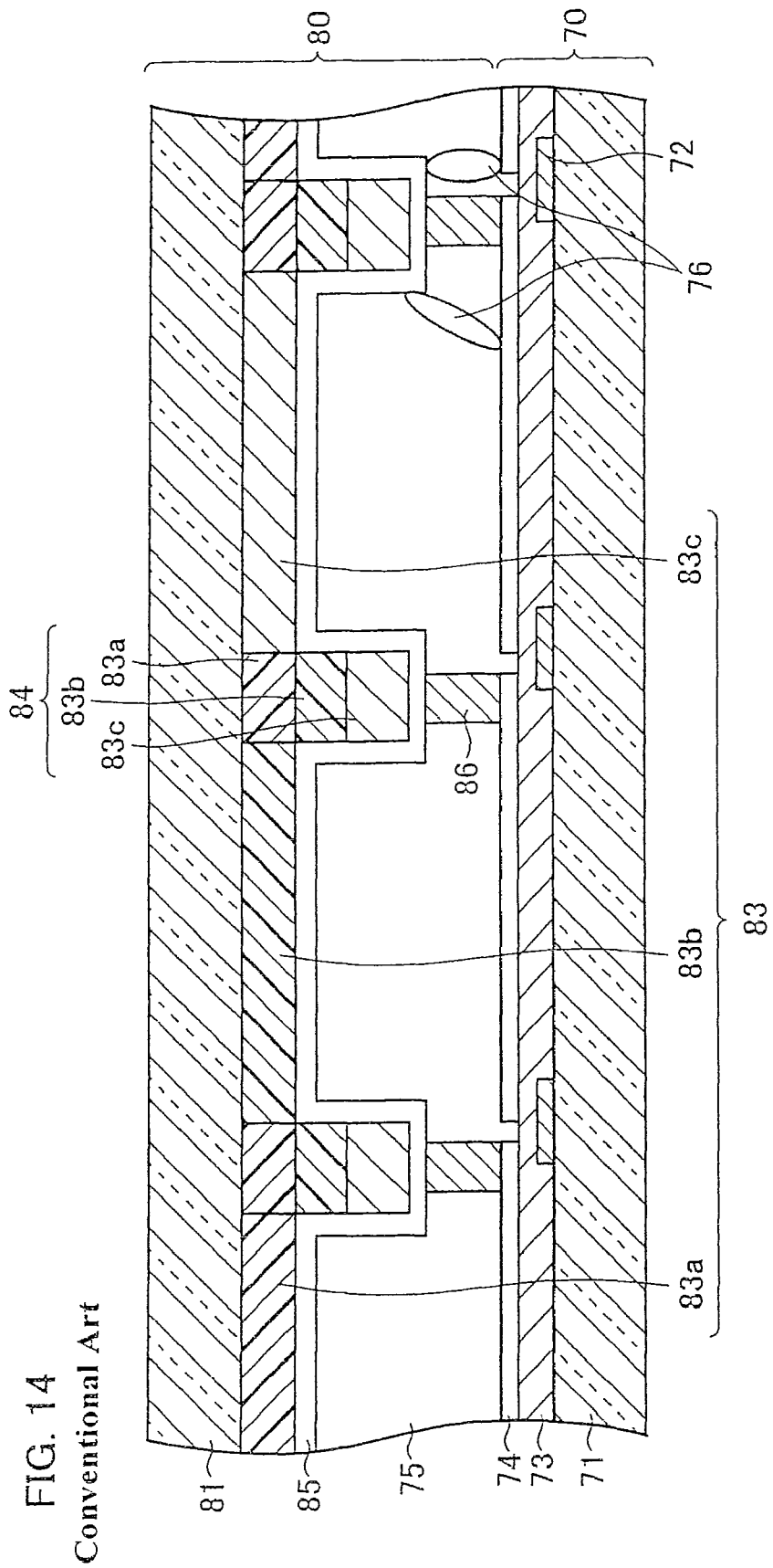
FIG. 14 is a cross section showing another conventional liquid crystal display apparatus.

The following will discuss a further embodiment of the present invention in reference to FIGS. 10-12. By the way, members having the same functions as those described in Embodiment 1 with figures are given the same numbers, so that the descriptions are omitted for the sake of convenience.

In the stacked layer 24 as said at least one protruding structure section of Embodiments 1 and 2, not less than color layers (including the black matrix layer 22) are stacked. Present invention, however, is not limited to this, so that said at least one protruding structure section may include only two layers.

FIG. 10 shows a liquid crystal display apparatus 3 of the present embodiment. The liquid crystal display apparatus 3 does not include the black matrix layer 22 described in Embodiments 1 and 2, while includes a color filter substrate 40 that includes a stacked layer 44 in place of the stacked layer 24 and includes an insulative resin film (insulating layer) 46 in place of the insulative resin film 26 or 36.

As shown in FIG. 10, the color filter substrate 40 is arranged such that the first color layer 23a, the second color layer 23b, and the third color layer 23c are formed on the substrate 21, and between these first to third color layers, a stacked layer 44 made up of the first and third color layers 23a and 23c. The stacked layer 44 in the present embodiment is made up of the first and third color layers 23a and 23c. However, the stacked layer 44 may be made up of another combination of the color layers, e.g. the first and second color layers 23a and 23b and the second and third color layers 23b and 23c. The stacked layer 44 may be formed by causing the respective ends of the neighboring color layers 23 to overlap with each other. That is, the stacked layer 44 may be formed by causing: the first and second color layers 23a and 23b to be overlapped; the second and third color layers 23b and 23c to be overlapped; or the first and third color layers 23a and 23c to be overlapped.

On the stacked layer 44, as shown in FIG. 10, the opposing electrode 25 is formed. Also, the insulative resin film 46 is formed so as to cover the entire surface of a part of the opposing electrode 25 on the stacked layer 44. The insulative resin film 46 is provided for preventing the short circuit between the opposing electrode 25 and the pixel electrode 14 on account of a conductive matter.

In the liquid crystal display apparatus 3 including the color filter substrate 40, a cell gap between the color filter substrate 40 and the TFT array substrate 10 is controlled by spacers made of plastic bead, glass fiber, and the like (not illustrated). In other words, while in Embodiments 1 and 2 the cell gap is sustained by the contact between the insulative resin film 26 or 36 and the pixel electrode 14, the insulative resin film 46 of the present embodiment is not in touch with the pixel electrodes 14 of the TFT array substrate 10. On this account, when the color filter substrate 40 and the TFT array substrate 10 are fixed, the spacers are dispersed so that the cell gap is sustained, and hence the substrates are fixed with a predetermined gap being formed therebetween. On this account, the stacked layer 44 and the insulative resin film 46 covering the part of the opposing electrode 25 on the stacked layer 44 are not used as the spacers.

However, as described above, the distance between the part of the opposing electrode 25 on the stacked layer 44 and the pixel electrode 14 is narrower than the distance between the parts of the opposing electrode 26 on the color layer 23 and the pixel electrodes 14. On this account, the short circuit on account of the existence of the conductive matter is likely to occur in a space between the part of the opposing electrode 25 on the stacked layer 44 and the pixel electrode 44, in comparison with a space between the parts of the opposing electrode 25 on the color layer 23 and the pixel electrodes 14. In view of this, as shown in FIG. 10, the insulative resin film 46 is provided on the entire surface of the part of the opposing electrode 25 on the stacked layer 44, in order to prevent the short circuit between the opposing electrode 25 and the pixel electrodes 14 on account of the presence of the conductive matter.

A method of manufacturing the color filter substrate 40 will be specifically described in reference to FIGS. 11(a)-11(d) and 12(a)-12(d). FIGS. 11(a)-11(d) and 12(a)-12(d) are cross sections illustrating the manufacturing process of the color filter substrate 40.

As shown in FIG. 11(a), on the substrate 21, for instance, a photosensitive resin liquid for the first color layer 23a is applied by the spin coat method and dried, so that a first resin layer 23p is formed. Subsequently, the first resin layer 23p is exposed to light and developed, using a photo mask 51 that is arranged in such a manner as to expose areas on the substrate 21 where the first color layer 23a and the stacked layer 44 are formed. With this, as shown in FIG. 11(b), the first resin layer 23p is removed from the areas where the second and third color layers 23b and 23c will be formed, and consequently the first color layer 23a is formed.

Subsequently, by steps similar to the step for forming the aforesaid first color layer 23a, the second color layer 23b and the third color layer 23c are successively formed as shown in FIGS. 11(c), 11(d), 12(a), and 12(b). That is, by the spin coat method and the like, a photosensitive resin liquid for the second color layer 23b is applied and dried, a second resin layer 23q is formed as shown in FIG. 11(c). Then, using a photo mask 52, the exposure and the development are performed. The photo mask 52 is formed in such a manner as to expose the second resin layer 23q in an area where the second color layer 23b will be formed. With this, as FIG. 11(d) shows, the second resin layer 23q in the areas on the substrate 21 where the first and third color layers 23a and 23c will be formed is removed, and consequently the second color layer 23b is formed.

In the next place, by the spin coat method and the like, a photosensitive resin liquid for the third color layer 23c is applied and dried, so that a third resin layer 23r is formed as shown in FIG. 12(a). Then, using a photo mask 53, the exposure and the development are performed. The photo mask 53 is formed in such a manner as to expose (i) an area where the third color layer 23c will be formed and (ii) the third resin layer 23r on the first color layer 23a where the stacked layer 44 will be formed. With this, as shown in FIG. 12(b), the third resin layer 23r (1) on the first color layer 23a where the stacked layer 44 is formed and (2) in an area on the substrate 21 where the third color layer 23c will be formed turns to the third color layer 23c. In this manner, on the substrate 21, the first color layer 23a, the second color layer 23b, the third color layer 23c, and the stacked layer 44 are formed.

Subsequently, as shown in FIG. 12(c), on the first to third color layers 23a-23c and the stacked layer 44, a transparent conductive film is vapor-deposited by, for instance, sputtering, so that the opposing electrode 25 is formed. Then, on the opposing electrode 25, a photosensitive insulative resin liquid is applied by the spin coat method and dried. As a result, a photosensitive insulative resin layer (photosensitive resin layer) 46p is formed as shown in FIG. 12(d). Then, using a photo mask 54, the exposure and development of the photosensitive insulative resin layer 46p are performed in such a manner as to expose an area covering the entire surfaces of part of the opposing electrode 25 on the stacked layer 44. With this, as shown in FIG. 10, the insulative resin film 46 is formed on the entire surface of the part of the opposing electrode 25 covering the stacked layer 44, while the photosensitive insulative resin layer 46p applied to unexposed areas is removed. Subsequently, the alignment layer 9 is formed and consequently the color filter substrate 40 is obtained.

Note that, the stacked layer 44 may be made up of two layers having different colors, or three layers having different colors. Alternatively, a black matrix layer may be included. In summary, the stacked layer 44 is formed by depositing different colors of layers so that an OD value for obtaining sufficient shielding is obtained. This OD value typically indicates light transmission density in a visible light range between 400 nm and 700 nm, and is calculated by the following equation:

$$OD \text{ Value} = -\log(I'/I)$$

In this equation, I indicates the light intensity of incoming light and I' indicates the light intensity of outgoing light The larger the OD value is, the lower the light transmittance is and the higher the shielding property is.

As described above, in the color filter substrate of the present invention, the insulating layer is thicker than the alignment layer.

According to this arrangement, since the insulating layer on said at least one protruding structure section is thicker than the alignment layer, the part of the opposing electrode covering said at least one protruding structure section is not easily exposed to the outside, even if the insulating layer on said at least one protruding structure section is damaged by a foreign matter and the like.

In the color filter substrate of the present invention, a part of the insulating layer, the part being formed on a top portion of said at least one protruding structure section with the opposing electrode being interposed between the part and the top portion, is at least partially thicker than a remaining part of the insulating layer.

According to this arrangement, when the aforesaid color filter substrate is adopted as one of a pair of opposing electrodes adopted in a liquid crystal display device and the like, the contact area of the insulating layer, where the insulating layer is in touch with a pixel electrode substrate that is the other one of the pair of the opposing electrodes, can be controlled. That is to say, a part of the area of the insulating layer covering the top portion of said at least one protruding structure section is relatively thicker than the remaining part, so that, at the aforesaid part of the area, the insulating layer can be in touch with the pixel electrode. On this account, it is possible to cause the insulating layer and the pixel electrode substrate to be in touch with each other, at the contact area having a desired size.

In the color filter substrate of the present invention, said at least one protruding structure section is arranged such that protruding structure section forming layers having different colors are stacked.

In the color filter substrate of the present invention, said at least one protruding structure section forming layers include at least one of the color layers constituting the colorized layer.

In the color filter substrate of the present invention, the protruding structure section forming layer is arranged such that more than one of the color layers constituting the colorized layer are stacked.

According to the arrangements above, the protruding structure section is formed by the color layers constituting the colorized layer. With this, for forming the protruding structure section, it is possible to adopt materials used for forming the color layers of the colorized layer, so that the types of materials for manufacturing the color filter substrate do not increase.

The color filter substrate of the present invention includes a black matrix layer as one of the color layers constituting the colorized layer.

In the color filter substrate of the present invention, the protruding structure section includes a black matrix layer.

According to the arrangement above, since the black matrix layer is provided, it is possible to form, in the color filter substrate, a shading area for preventing the leakage of light and blocking outside light. This makes it possible to improve the display contrast. In particular, when the protruding structure section includes the black matrix layer, the prevention of the leakage of light and the blocking of the outside light are suitably performed at the protruding structure section, so that the display contrast is further improved. When the protruding structure section is formed by superposing the color layers on the black matrix layer, the transmittance in the transmitting area on the color filter substrate does not deteriorate. On this account, it is possible to provide the color filter substrate that excels in the display contrast and the display quality.

In the color filter substrate of the present invention, the insulating layer is made of photosensitive resin. According to this arrangement, since the insulating layer is made of photosensitive resin, the insulating layer can be easily formed by carrying out patterning by photolithography. Furthermore, when the insulating layer is made of photosensitive resin, the thickness of the insulating layer can be easily controlled by adjusting an amount of light for the exposure, on the occasion of the photolithography. For this reason, the manufacturing process of the color filter substrate is simplified and the manufacturing cost is reduced.

In the aforesaid color filter substrate of the present invention, the insulating layer is made of an inorganic silicon compound.

The inorganic silicon compound has such hardness that the compound is not easily broken on the occasion of the contact with a foreign matter and the like. For this reason, it is possible to provide the insulating layer that is not easily broken on the occasion of the contact with a foreign matter and the like.

In the color filter substrate of the present invention, the insulating layer is not less than 0.1 μm thick.

That is, when the thickness of the insulating layer is set as above, the breakage on account of a foreign matter and the like and the exposure of the opposing electrode to the outside can be prevented. Also, when the insulating layer of the color filter substrate is pasted on another opposing substrate, it is possible to keep the color filter substrate and the opposing substrate to be suitably distanced from each other.

In the color filter substrate of the present invention, the protruding structure section includes at least 3 color layers being stacked.

That is to say, the opposing electrode on the protruding structure section tends to contact the pixel electrode of the pixel electrode substrate, when a foreign (conductive) matter exists between a pair of opposing substrate and the foreign matter enters an area, where the protruding structure section is high. According to the arrangement above, it is possible to surely prevent the opposing electrode from short-circuiting with the pixel electrode, even if the protruding structure is high because of the not less than 3 color layers being stacked therein.

More specifically, when a typical color filter substrate, in which color layers are formed using photo resist in which colorants are dispersed, adopts, as a spacer, a protruding structure section in which color layers are stacked, the protruding structure section is typically made up of not less than three layers, in consideration of the relationship between the thickness of the color layers and the cell gap. This is because, no additional members such as plastic bead, which is required for sustaining the cell gap, is necessary, as the protruding structure section functions as the spacer.

When not less than three color layers are stacked, however, the short-circuit tends to occur in comparison with the case where two color layers are stacked so that the protruding structure section is used as a color-superposed black matrix (BM). This is because, in the case where not less than three color layers are stacked, the part of the opposing electrode on the protruding structure section of the color filter substrate is close to the pixel electrode of the pixel electrode substrate. Moreover, when not less than three color layers are stacked, the size of the base of these layers is large in consideration of the misalignment of the layers, so that the area where the part of the opposing electrode on the protruding structure section of the color filter substrate is close to the pixel electrode of the pixel electrode substrate is large. According to the above-described arrangement, however, the short-circuit between the opposing electrode and the pixel electrode is certainly prevented, even if the protruding structure section is high on account of not less than three color layers being stacked.

In the color filter substrate of the present invention, a protruding section for controlling the alignment of liquid crystal is provided on a part of the colorized layer, and the protruding section is made of a material identical with that of the insulating layer.

According to this arrangement, when the aforesaid color filter substrate is, for instance, adopted as one of a pair of opposing substrates of a liquid crystal display apparatus, the alignment of the liquid crystal can be controlled by the protruding section. Moreover, since the protruding section is made of a material identical with that of the insulating layer, it is unnecessary to use an additional material for forming the protruding section.

The liquid crystal display apparatus of the present invention, in which a color filter substrate and a pixel electrode substrate including pixel electrodes face each other with a liquid crystal layer being interposed therebetween, is arranged such that, the color filter substrate is one of the above-described color filter substrates, and in an insulating layer provided on the protruding structure section of the color filter substrate, at least a part of an area covering a part of the opposing electrode on the top portion of the protruding structure section is in touch with the pixel electrode substrate.

According to this arrangement, the insulating layer covering the entire surface of the part of the opposing electrode covering the protruding structure section is provided, i.e. the insulating layer is provided in the area where the part of the opposing electrode on the surface of the protruding structure section is close to a pixel electrode of the pixel electrode substrate. On this account, even if a conductive matter and the like exists in a liquid crystal layer provided between the color filter substrate and the pixel electrode substrate at a predetermined distance (cell gap) therebetween, it is possible to prevent the opposing electrode from short-circuiting with the pixel electrode via the conductive matter. Therefore the yield of the liquid crystal display apparatus is improved.

The protruding structure section, a part of the opposing electrode covering the top portion of the protruding structure section, and the insulating layer can be used as a spacer for obtaining the cell gap between the color filter substrate and the opposing substrate that opposes to the color filter substrate. This makes it possible to do away with a step of manufacturing the spacer, so that the manufacturing process is simplified and the manufacturing cost is reduced.

The liquid crystal display apparatus of the present invention, in which a color filter substrate and a pixel electrode substrate including pixel electrodes face each other with a liquid crystal layer being interposed therebetween, is arranged such that, the color filter substrate is one of the aforesaid color filter substrates each covering the part of the opposing electrode covering the protruding structure section, in such a manner as to form at least two areas that are different in thickness, and the thickness of a part of the insulating layer formed on the protruding structure section of the color filter substrate, at which the insulating layer contacts the pixel electrode substrate, is thicker than the remaining parts of the insulating layer.

According to this arrangement, it is possible to control the size of the contact area between the pixel electrode and the insulating layer, and hence the cell gap of the liquid crystal display apparatus is suitably obtained. With this, it is possible to prevent the formation of bubbles in the liquid crystal layer and the occurrence of the irregularity of brightness on account of the biased liquid crystal.

In the method of manufacturing the color filter substrate of the present invention, the insulating layer is formed so as to be thicker than the alignment layer.

According to this method, even if the insulating layer on the protruding structure section is damaged by a foreign matter and the like, a part of the opposing electrode covering the protruding structure section is not easily exposed to the outside.

In the method of manufacturing the color filter substrate of the present invention, at least a part of the area of the insulating layer on the top portion of the protruding section is formed so as to be thicker than the remaining parts of the area of the insulating layer.

According to this method, when the color filter substrate is adopted as one of a pair of opposing substrates used in a liquid crystal display apparatus and the like, the contact area between the insulating layer and the pixel electrode substrate that is the other one of the pair of the opposing substrates can be controlled. That is to say, at least a part of the area of the insulating layer on the top portion of the protruding structure section is relatively thicker than the remaining parts, and at this part the insulating layer is in contact with the pixel electrode substrate. Therefore, it is possible to cause the insulating layer and the pixel electrode substrate to contact each other, at the contact area having a desired size.

In the method of manufacturing the color filter substrate of the present invention, in the step of forming the insulating layer, a photosensitive resin layer is formed on the surface of the opposing electrode, and the photosensitive resin layer is exposed to light and developed.

According to this method, the insulating layer can be easily formed by carrying out patterning by photolithography.

In the aforesaid method of manufacturing the color filter of the present invention, in the step of forming the insulating layer, a resin layer area of the photosensitive resin layer, the resin layer area being formed on the protruding structure section, is exposed to at least two sets of light of different amounts.

According to this method, the thickness of the insulating layer can be easily controlled by adjusting the amount of light for the exposure, on the occasion of the photolithography.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A color filter substrate, comprising:
a colorized layer that is formed on a substrate and includes a plurality of color layers being aligned side by side;
at least one protruding structure section that is formed on the substrate, includes a plurality of color layers being stacked, and the protruding structure section includes all of the stacked color layer structure that protrudes beyond the layer of color layers of the colorized layer aligned side by side;
an opposing electrode covering the colorized layer and said at least one protruding structure section; and
an alignment layer stacked on at least a piece of the opposing electrode, the piece covering the colorized layer,
an insulating layer being stacked on an entire surface part of the opposing electrode, said part entirely covering an entire surface portion of said at least one protruding structure section, the portion protruding in comparison with another part of the opposing electrode.

2. The color filter substrate as defined in claim 1, wherein, the insulating layer is thicker than the alignment layer.

3. The color filter substrate as defined in claim 1, wherein, a part of the insulating layer, the part being formed on a top portion of said at least one protruding structure section with the opposing electrode being interposed between the part and the top portion, is at least partially thicker than a remaining part of the insulating layer.

4. The color filter substrate as defined in claim 1, wherein, said at least one protruding structure section is arranged such that protruding structure section forming layers having different colors are stacked.

5. The color filter substrate as defined in claim 4, wherein, the protruding structure forming layers include at least one of the color layers constituting the colorized layer.

6. The color filter substrate as defined in claim 4, wherein, the protruding structure section forming layers include more than one of the color layers constituting the colorized layer.

7. The color filter substrate as defined in claim 1, wherein, one of the color layers constituting the colorized layer is a black matrix layer.

8. The color filter substrate as defined in claim 1, wherein, a protruding section for controlling alignment of liquid crystal is provided on a part of the colorized layer, and the protruding section is made of a material identical with a material of the insulating layer.

9. The color filter substrate of claim 1, wherein a maximum width of the insulating layer is greater than a maximum width of the protruding structure.

* * * * *